US012376027B2

(12) United States Patent
Ly et al.

(10) Patent No.: US 12,376,027 B2
(45) Date of Patent: Jul. 29, 2025

(54) AUTHORIZATION, CREATION, AND MANAGEMENT OF PERSONAL NETWORKS

(71) Applicant: InterDigital Patent Holdings, Inc., Wilmington, DE (US)

(72) Inventors: Quang Ly, North Wales, PA (US); Michael Starsinic, Newtown, PA (US); Jiwan Ninglekhu, Royersford, PA (US); Pascal Adjakple, Great Neck, NY (US); Catalina Mladin, Hatboro, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/685,790

(22) PCT Filed: Aug. 24, 2022

(86) PCT No.: PCT/US2022/075414
§ 371 (c)(1),
(2) Date: Feb. 22, 2024

(87) PCT Pub. No.: WO2023/028527
PCT Pub. Date: Mar. 2, 2023

(65) Prior Publication Data
US 2024/0365407 A1    Oct. 31, 2024

Related U.S. Application Data

(60) Provisional application No. 63/236,748, filed on Aug. 25, 2021.

(51) Int. Cl.
*H04W 4/00* (2018.01)
*H04W 48/16* (2009.01)
(Continued)

(52) U.S. Cl.
CPC ......... *H04W 48/18* (2013.01); *H04W 48/16* (2013.01); *H04W 76/10* (2018.02); *H04W 76/11* (2018.02); *H04W 84/10* (2013.01)

(58) Field of Classification Search
CPC ..... H04W 48/18; H04W 76/10; H04W 84/10; H04W 76/11
(Continued)

(56) References Cited

U.S. PATENT DOCUMENTS 11,108,795 B2 *   8/2021   Lee ..................... G06F 21/566
11,363,037 B2 *   6/2022   Karin .................... G06F 21/55
(Continued)

FOREIGN PATENT DOCUMENTS

CN          110999514 A       4/2020
WO      WO 2019/034291 A1    2/2019
WO      WO 2021/092480 A1    5/2021

OTHER PUBLICATIONS

3rd Generation Partnership Project, "Technical Specification Group Services and System Aspects; Study on Personal Internet of Things (PIoT) networks (Release 18)", 3GPP TR 22.859 V1.0.0, Mar. 2021, 36 pages.
(Continued)

*Primary Examiner* — Marceau Milord
(74) *Attorney, Agent, or Firm* — Flaster Greenberg P.C.

(57) ABSTRACT

A wireless transmit/receive unit may request, from a core network, authorization for creating one or more personal networks of one or more devices. After being granted authorization, the UE may be enabled to create a personal network and to cause a PDU session for the personal network to be established with the core network. The UE may enable members of the personal network to send data associated with the personal network via the PDU session.

20 Claims, 16 Drawing Sheets

(51) Int. Cl.
*H04W 48/18* (2009.01)
*H04W 76/10* (2018.01)
*H04W 76/11* (2018.01)
*H04W 84/10* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 12,052,594 | B2* | 7/2024 | Lee | H04L 67/562 |
| 12,052,783 | B2* | 7/2024 | Kawasaki | H04W 60/00 |
| 12,058,763 | B2* | 8/2024 | Kim | H04W 76/25 |
| 12,063,592 | B2* | 8/2024 | Albasheir | H04W 4/90 |
| 12,082,273 | B2* | 9/2024 | Xu | H04W 76/12 |
| 12,101,707 | B2* | 9/2024 | Padlikar | H04W 40/246 |
| 12,107,927 | B2* | 10/2024 | Chandramouli | H04W 76/12 |
| 12,133,277 | B2* | 10/2024 | Wang | H04W 76/19 |
| 2018/0227743 | A1* | 8/2018 | Faccin | H04W 8/08 |
| 2018/0270840 | A1* | 9/2018 | Griot | H04W 72/56 |
| 2018/0359795 | A1 | 12/2018 | Baek et al. | |
| 2019/0028961 | A1 | 1/2019 | Faccin et al. | |
| 2019/0053147 | A1 | 2/2019 | Qiao et al. | |
| 2019/0222489 | A1 | 7/2019 | Shan | |
| 2019/0289003 | A1 | 9/2019 | Setchell et al. | |
| 2019/0364063 | A1* | 11/2019 | Lee | H04L 63/1408 |
| 2020/0196375 | A1* | 6/2020 | Ryu | H04W 76/34 |
| 2020/0314119 | A1* | 10/2020 | Karin | H04L 63/1408 |
| 2021/0259047 | A1 | 8/2021 | Liu | |
| 2024/0073996 | A1* | 2/2024 | Chun | H04W 76/32 |
| 2024/0107291 | A1* | 3/2024 | Manithara Vamanan | H04L 12/1407 |
| 2024/0235866 | A1* | 7/2024 | Talebi Fard | H04W 4/02 |
| 2024/0298253 | A1* | 9/2024 | Talebi Fard | H04W 48/18 |

OTHER PUBLICATIONS

3$^{rd}$ Generation Partnership Project (3GPP), Technical Specification Group Services and System Aspects, "System Architecture for the 5G System (5Gs); Stage 2", (Release 17), 3GPP TS 23.501 V17.1.1, Jun. 2021, 526 pages.

3$^{rd}$ Generation Partnership Project (3GPP), Technical Specification Group Services and System Aspects, "Study on Personal Internet of Things (PIoT) Networks", (Release 18), 3GPP TR 22.859 V18.0.1, Jun. 2021, 47 pages.

3$^{rd}$ Generation Partnership Project (3GPP), Technical Specification Group Services and System Aspects, "Study on User Centric Identifiers and Authentication", (Release 16), 3GPP TR 22.904 V16.1.0, Sep. 2018, 20 pages.

3$^{rd}$ Generation Partnership Project (3GPP), Technical Specification Group Services and System Aspects, "General Universal Mobile Telecommunications System (UMTS) Architecture", (Release 16), 3GPP TS 23.101 V16.0.0, Jul. 2020, 14 pages.

3$^{rd}$ Generation Partnership Project (3GPP), Technical Specification Group Services and System Aspects, "Procedures for the 5G System (5GS); Stage 2", (Release 17), 3GPP TS 23.502 V17.1.0, Jun. 2021, 692 pages.

3$^{rd}$ Generation Partnership Project, Technical Specification Group Services and System Aspects, "Study on Enhanced Support of Non-Public Networks (NPN)", (Release 17), 3GPP TR 23.700-07 V17.0.0, Mar. 2021, 245 pages.

3$^{rd}$ Generation Partnership Project, Technical Specification Group Services and System Aspects, "Study on System Enhancement for Proximity Based Services (ProSe) in the 5G System (5GS)", (Release 17), 3GPP TR 23.752 V17.0.0, Mar. 2021, 183 pages.

3$^{rd}$ Generation Partnership Project; "KI #4, Sol #5: Update to clarify how the UE discovers and selects the onboarding network", Samsung, S2-2007535, SA WG2 Meeting #141E, Oct. 12-Oct. 23, 2020, Electronic, Elbonia, 9 pages.

* cited by examiner

*Personal Network ID: xxxxx*

| Network Configurations | | |
|---|---|---|
| Member | User ID | MC  GC |
| Dev1 | ui1204592 | ● ○ |
| Dev2 | ui1385376 | ○ ○ |
| Dev3 | ui1143690 | ○ ○ |
| UE1 | | ● ● |
| UE2 | | ○ ● |

FIG. 9

AUTHORIZATION, CREATION, AND MANAGEMENT OF PERSONAL NETWORKS

CROSS-REFERENCE TO RELATED APPLICATIONS

This application is the 371 National Stage of International Application No. PCT/US2022/075414, filed Aug. 24, 2022, which claims the benefit of U.S. Provisional Patent Application No. 63/236,748, filed Aug. 25, 2021, the contents of which are incorporated by reference herein in their respective entirety.

BACKGROUND

With the proliferation of home automation and wearable devices, users and homeowners will increasingly desire to create personal networks to automate and simplify their lives. In addition to having the ability to monitor and control the devices locally, users and homeowners would also like to access those devices remotely and without additional configurations or security settings. Furthermore, end-to-end security becomes vital, especially for personal health devices. So-called Personal Internet of Things (PIOT) networks are being considered and studied, as described for example in the Third Generation Partnership Project (3GPP) TR 22.859, Study on Personal Internet of Things (PIOT) networks; V18.0.1 (2021-06).

SUMMARY

Described herein are methods, apparatuses, and systems for authorizing, creating, and managing personal networks (PNs), such as, for example, PIOT networks. A core network may be enhanced to support the management of personal networks, including the storage of management data of the personal networks. A wireless transmit/receive unit (WTRU) may send, to a core network, a request for authorization to create and manage a personal network of one or more devices. The WTRU may receive, from the core network, a message comprising an indication that the WTRU is authorized to create and manage the personal network and further comprising a policy associated with the personal network. The policy may comprise a data network name (DNN), among other information associated with the requested personal network. Using the DNN, the WTRU may cause establishment of a protocol data unit (PDU) session for sending data associated with the personal network to the core network. For example, the WTRU may send, to the core network, a request to establish a PDU session. The request may comprise the DNN. Upon success, the WTRU may receive, from the core network, a message indicating establishment of the PDU session. Once established, the WTRU or one or more of the other devices of the personal network may send data associated with the personal network to the core network via the established PDU session.

In addition to the DNN, the policy may comprise: one or more single network slice selection assistance information (S-NSSAI) associated with one or more network slices available for use in connection with the personal network; one or more user identifiers for use in provisioning one or more non-3GPP devices of the one or more devices; an identifier associated with the personal network; or an indication of a maximum number of personal networks authorized for the WTRU. The policy may further comprises one or more user identifiers, which the WTRU may provision to one or more non-3GPP devices of the one or more devices of the personal network to enable those non-3GPP devices to communicate via the core network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIG. 9 shows an example graphical user interface (GUI).

DETAILED DESCRIPTION

Figure 1:
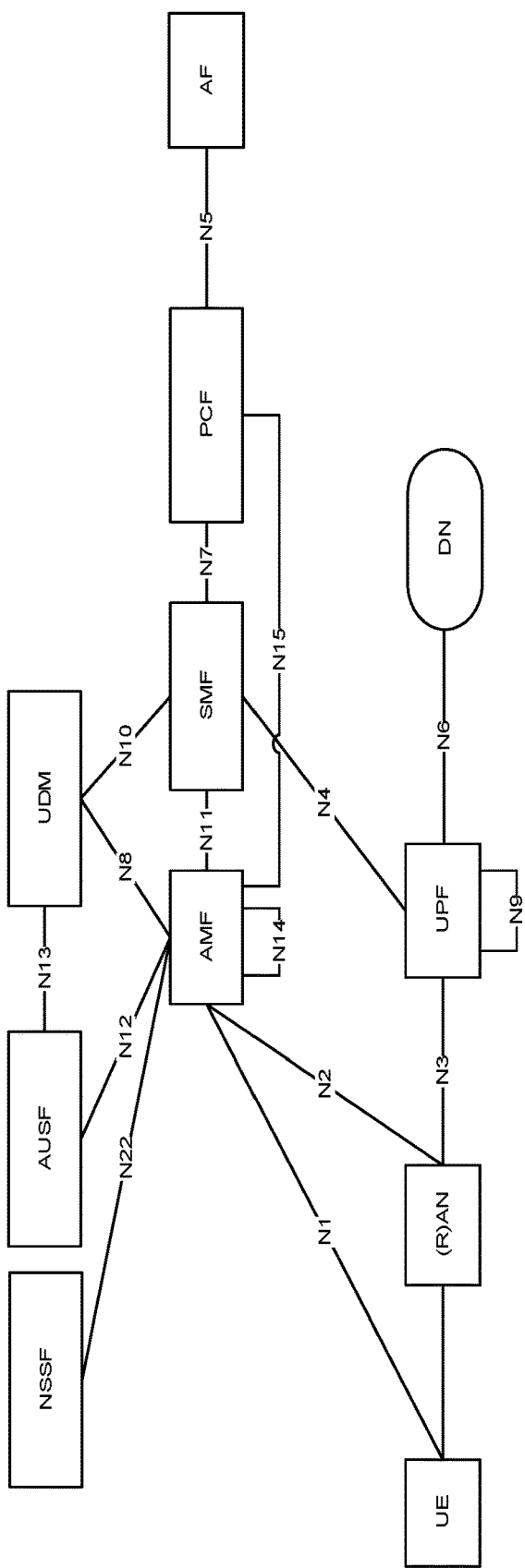
FIG. 1 shows an example non-roaming 5G system architecture.

FIG. 1 shows an example non-roaming 5G system architecture in reference point representation, in which various entities interact with each other over the indicated reference points. As shown, in the example architecture, a wireless transmit/receive unit (WTRU), such as user equipment (UE), may communicate with a core network (CN) to establish control signaling and enable the UE to use services from the CN. Examples of control signaling functions are registration, connection and mobility management, authentication and authorization, session management, etc. See, e.g., 3GPP TS 23.501, System Architecture for the 5G System; Stage 2, V17.1.1 (2021-06).

The following descriptions highlight some of the Network Functions (NFs) from FIG. 1 that are involved with control signalling:

Access and Mobility Function (AMF): The UE sends an N1 message through the radio access network (RAN) node to the AMF to perform control plane signaling such as registration, connection management, mobility management, access authentication and authorization, etc.

Session Management Function (SMF): The SMF is responsible for session management involved with establishing protocol data unit (PDU) sessions to allow UEs to send data to data networks (DNs) such as the internet or to an application server and other session management related functions.

Policy and Control Function (PCF): The PCF provides the policy framework that governs network behavior, accesses subscription information to make policy decisions, etc.

Authentication Server Function (AUSF): The AUSF supports authentication of UEs for 3GPP and untrusted non-3GPP accesses.

Unified Data Management/Repository (UDM/UDR): The UDM/UDR supports generation of 3GPP AKA Authentication Credentials, user identification handling, subscription management and storage, etc.

Network Slice Selection Function (NSSF): The NSSF is involved with aspects of network slice management such as selection of network slice instances for UEs, management of network slice selection assistance information (NSSAI), etc.

Note that, as used herein, the terms "procedure" and "method" may be used synonymously unless otherwise noted.

The RAN node offers communication access from the UE to the core network for both control plane and user plane communications. A UE establishes a PDU session with the CN to send data traffic over the user plane through the (R)AN and user plane function (UPF) nodes of the 5G system (5GS). Uplink traffic is sent by the UE and downlink traffic is received by the UE using the established PDU session. Data traffic flows between the UE and the DN through the intermediary nodes: (R)AN and UPF.

In Release 18, 3GPP began work on defining requirements for Personal IoT Networks (PINs) that can attach to the 5G network for ubiquitous access. The PINs may consist of localized networks of wearable or home automation devices belonging to a user or homeowner. 3GPP TR 22.859 provides use cases and requirements for the PINs.

One important aspect of a PIN involves the provisioning of user identifiers for devices that do not have a subscriber identity module (SIM) card or a subscription with a mobile network operator (MNO) and use non-3GPP access technology. These devices may be referred to as non-3GPP devices. As used herein, the term "non-3GPP device" generally refers to a device that uses non-3GPP access technology and does not have 3GPP credentials. The user identifier of such non-3GPP devices may be associated with a device that is linked to a user subscription with an MNO to enable the device access to the 5G network. The device is then able not only to communicate with other devices within the PIN but is also able to communicate with other devices over the 5G network.

3GPP TR 22.859 also defines devices within a PIN as PIN elements and PIN elements can have management or gateway capabilities. PIN elements that have management capability manage the operations of the PIN while PIN elements with gateway capability provide access for members of the PIN to the 5G network. A PIN element such as a UE can have both management and gateway capabilities.

The 3GPP has also studied how the 5G network could be enhanced to support a user-centric authentication layer on top of the existing subscription authentication. The results of this study have been captured in 3GPP TR 22.904. This study evaluated how the 3GPP system can provide different users using the same UE with customized services, how to identify users of devices behind a gateway with a 3GPP subscription but without the devices having a dedicated 3GPP subscription, and how a user identifier can be linked to a subscription to access 3GPP services via non-3GPP access.

A user identity in a 3GPP system should identify a device, such as a mobile equipment (ME) or a device without a subscription, a person, or an application, to an MNO that is associated with the device, person, or application. The MNO has a business relationship with the device, person, or application and is responsible for authenticating and authorizing device, person, or application requests and for maintaining information record(s) that are associated with the device, person, or application.

One challenge with existing systems may be illustrated with the following example. A homeowner may be in the process of automating their home with various devices such as surveillance cameras, door locks, garage door openers, lights, outlets, ceiling fans, large and small appliances, etc. The homeowner would like to centrally manage the devices on their smartphone instead of managing the devices via apps associated with each individual vendor. However, a lot of the devices do not have SIM card capability. The homeowner would like to access the devices locally within the home and remotely when the homeowner is away from the home, e.g., the homeowner is able to view video from the surveillance cameras when travelling. The homeowner would like to be able to easily configure the various personal networks with a smartphone and be able to seamlessly access the devices in the networks from anywhere in the world without additional configuration or security settings.

Currently, configurations for connecting devices to a network may vary depending on each device manufacturer, and at times such configurations may be overly complicated for the typical user. In many cases, communications between devices within the network are limited to devices of the same manufacturer or are not even available due to devices being in different product lines, e.g., manufacturers need to plan for inter-product communications into the design of their products. In addition, security mechanisms vary considerably among device manufacturers and may not be robust enough to provide secure communications end-to-end. For some applications, such as personal health monitoring, robust security mechanisms are critical to preserve user privacy. Finally, remote access of the connected devices may vary considerably among manufacturers; some devices may be readily accessible while others may be difficult to access, sometimes requiring many attempts to communicate to the devices.

When creating such personal networks, there may be many instances where the members of the network may not be 3GPP devices, e.g., the devices may not have a SIM card or a 3GPP subscription to a mobile network operator and may use non-3GPP access technology. User identities were introduced to enable these types of devices to access the 5G network. However, how a UE is provisioned with the user identities and how a UE is authorized to create the personal networks has not heretofore been defined.

Furthermore, the devices may be headless devices without a user interface. In these cases, the members of the personal network may need to be provisioned with a user identity that is associated with a 3GPP subscription in order to access the 5G network. How a headless device is provisioned with a user identity that is linked to a 3GPP subscription requires a solution to enable the device to access the 5G network. In addition, the added security provided by the 5G system would ensure secure, end-to-end communications to protect the privacy of the user.

3GPP TR 22.859 references Personal IoT Networks when describing the use cases in the document. There may be implications with the term Personal IoT Networks as to limit the devices within these networks to only IoT devices. Note that user identities may also be applicable to a device that is architecturally a Mobile Equipment (ME) as per the user equipment functional model as described in TS 23.101. These devices may also be 3GPP devices without subscription e.g., devices with functions specified by 3GPP but with no SIM card or subscription. It is intended that the present description is not limited only IoT devices in a personal network, and the use of the term "personal network" or "personal IoT network" herein is used to describe a network that may encompass other types of devices that may not be considered as "IoT devices," such as gaming consoles, video streaming devices, and augmented reality (AR)/virtual reality (VR) glasses.

The terms "user identity" and "user identifier" are used herein to describe the process in which devices without a SIM card or without a subscription are provisioned with an identity or identifier to be able to communicate with the 5G network. The identity or identifier may be used by a non-3GPP device or a 3GPP device without SIM card or without subscription to access services from the 5G network and may be linked to a user subscription for tracking and charging purposes. Thus, the terms "user identity" and "user identifier" may be used interchangeably herein. Additionally, in the context of personal networks, the terms "user," "UE," and "WTRU" may be used interchangeably when describing interactions between the devices and the network.

Architectural Enhancements to Support Personal Networks

Personal networks will bring an influx of devices to access the 5G networks and expectations are that subscribers will each create many such networks in their home, office, and/or shop. A large majority of the devices in a personal network may consist of non-3GPP devices or 3GPP devices without a SIM card or without a subscription, which may require the provisioning of user identities to allow these devices to access the 5G network. Therefore, the management of user identities is an important aspect of allowing devices in the personal networks to access the 5G network. To not burden existing network functions in the 5G network with this additional functionality, a new network function may be defined, referred to herein as a personal network management function (PNMF), to handle the provisioning and management of user identities and personal network management.

Table 2 shows an example of the services and service operations that a PNMF may provide to other network functions, such as the AMF, UDM and CHF.

TABLE 2

| Service Name | Service Operation | Operation Semantics | Example Consumer(s) |
|---|---|---|---|
| Npnm_UserID | Registration | Request/Response | AMF, UDM, SMF, CHF, NEF, AF |
| | Get | Request/Response | AMF, UDM, SMF, CHF, NEF, AF |
| Npnm_NwCfg | Create | Request/Response | AMF, UDM, SMF, NEF, AF |
| | Update | Request/Response | AMF, UDM, SMF, NEF, AF |
| | Get | Request/Response | AMF, UDM, SMF, NEF, AF |
| | Delete | Request/Response | AMF, UDM, SMF, NEF, AF |

The Npnm_UserID_Registration service operation may be invoked in order to request to register for a pool of user identities and the associated data network name(s) (DNNs) and/or S-NSSAI(s) to use for creating PDU sessions for the personal networks. UE/Subscription identifiers (e.g., 5G-GUTI or SUPI) may be required inputs to the service. The number of user identities requested, or a list of device types or device capability with possibly the number of devices for each device type or device capability, for which user identities are being requested may be optional inputs to the service. The list of user identities and DNN(s) may be outputs of the service and a list of S-NSSAI(s) may optionally also be outputs of the service. This service operation may be used to request from the PNMF a pool of user identities for a UE as indicated by the UE or subscription identifier provided as an input. In addition, the request may also include a numerical value representing the number of user identities being requested. The output of the service operation may comprise a list of the user identities and the DNN(s) and S-NSSAI(s) for use with the personal network. This service operation may be used as part of authorizing UEs for the creation and management of personal networks.

The Npnm_UserID_Get service operation may be invoked in order to request to obtain the subscription ID associated with a user identity. The user identifier may be a required input to the service and the S-NSSAI(s) may be an optional input of the service. The UE/Subscription Identifier (e.g., 5G-GUTI or SUPI) may be an output of the service. This service operation may be used to request from the PNMF the Subscription Identifier that is associated with the given user identity for the purpose of associating the user identity with a UE subscription for charging purposes or identification of data traffic.

The Npnm_NwCfg_Create service operation may be invoked in order to request to create a context within the PNMF for saving management data for a personal network. A UE/Subscription identifier (e.g., 5G-GUTI or SUPI) or User ID or Configuration record ID, Personal Network ID may be required inputs to the service. A list of members of the personal network, information about members with management or gateway capability, PDU session ID with associate S-NSSAI and/or data network name (DNN), network configuration parameters, and an expiration value may be optional inputs to the service. A configuration record ID and operation status may be required outputs of the service. Transaction parameters, if available, may be optional outputs of the service.

This service operation may be used to request the creation of a configuration record where management data for a personal network is maintained within the PNMF. The configuration record ID may be used to identify the configuration record when requesting to modify data in the record. In addition, the request may also include configuration parameters for the personal network, such as a list of members of the personal network, information about members with management or gateway capability, PDU session ID with associate S-NSSAI and/or DNN, network configuration parameters, an expiration value, etc. The output of the service operation may be a record ID and an operational status of the request. Transaction parameters, if available, may be optional outputs of the service. This service operation may be used to save the management data associated with a personal network when it is first created.

The Npnm_NwCfg_Update service operation may be invoked in order to request an update of the management data stored in the PNMF for a personal network. A configuration record ID or Personal Network ID may be a required input to the service. A list of members of the personal network, information about members with management or gateway capability, PDU session ID with associate S-NSSAI and/or DNN, network configuration parameters, and an expiration date may be optional inputs to the service. A configuration record ID and an operation status may be required outputs of the service. Transaction parameters, if available, may be optional outputs of the service. This service operation may be used to update the management data saved in the PNMF for a personal network. This service operation may be used to update the management data stored in the PNMF to backup configuration data of a personal network.

The Npnm_NwCfg_Get service operation may be invoked in order to request to retrieve the management data of a personal network. Configuration record ID or Personal Network ID may be required inputs to the service. A list of members of the personal network, information about members with management or gateway capability, PDU session ID with associate S-NSSAI and/or DNN, network configuration parameters, and operation status may be required outputs of the service. Transaction parameters, if available, may be optional outputs of the service. This service operation may be used to retrieve the management data saved in the PNMF for a personal network. This service operation may be used during the process of retrieving management data for a personal network to recover backup information for the personal network.

The Npnm_NwCfg_Delete service operation may be invoked in order to request to delete management data for a personal network. Configuration record ID or Personal Network ID may be required inputs to the service and an indicator for specifying the release of user identities may be an optional input. Operation status may be an output of the service. Transaction parameters, if available, may be optional outputs of the service. This service operation is used to remove the management data saved in the PNMF for a personal network. This service operation may be used after a personal network is disbanded.

The management data may comprise:
PN identifier
List of PN members and their identifiers with contact information
Identification and contact information of members with gateway and management capability
PDU session ID, including S-NSSAI and/or DNN associated with the PDU session
Expiration of personal network
Broadcast/multicast support
Protocols (including discovery and security) supported
Network configuration parameters such as network type, WLAN SSID, BSSID, security mechanism, password, IP settings, DNS settings, MAC addresses, pairing codes, refresh interval, data usage limit, maximum number of members, etc.

Note that although the PNMF service operations may, as described herein, be provided by a new network function, it may also be incorporated as new services offered by existing NFs such as the UDM. This may offer a logical grouping of services as the UDM provides Subscriber Data Management and UE Authentication services that are necessary functions in authorizing UEs with the ability to create and manage personal networks.

Registration for the Authorization of Personal Networks

As mentioned, a personal network, whether consisting of wearable, home automation, or other devices, may have member devices that do not have a SIM card or a subscription to a mobile network operator. In order for these devices to have access to services from the 5G network, they need to be identifiable and associated with a user subscription. As a result, a user or homeowner would need to initiate a request via a UE to the mobile network operator to get authorization for creating and managing personal networks. The mobile network operator would then provide the UE with a policy that includes user identifiers for assignment to the devices and associate their usage of 5G services to the user's subscription. This request may be integrated with the registration request described in 3GPP TS 23.502, which may be used by a UE when registering to obtain the services of the 5G network.

Figure 2:
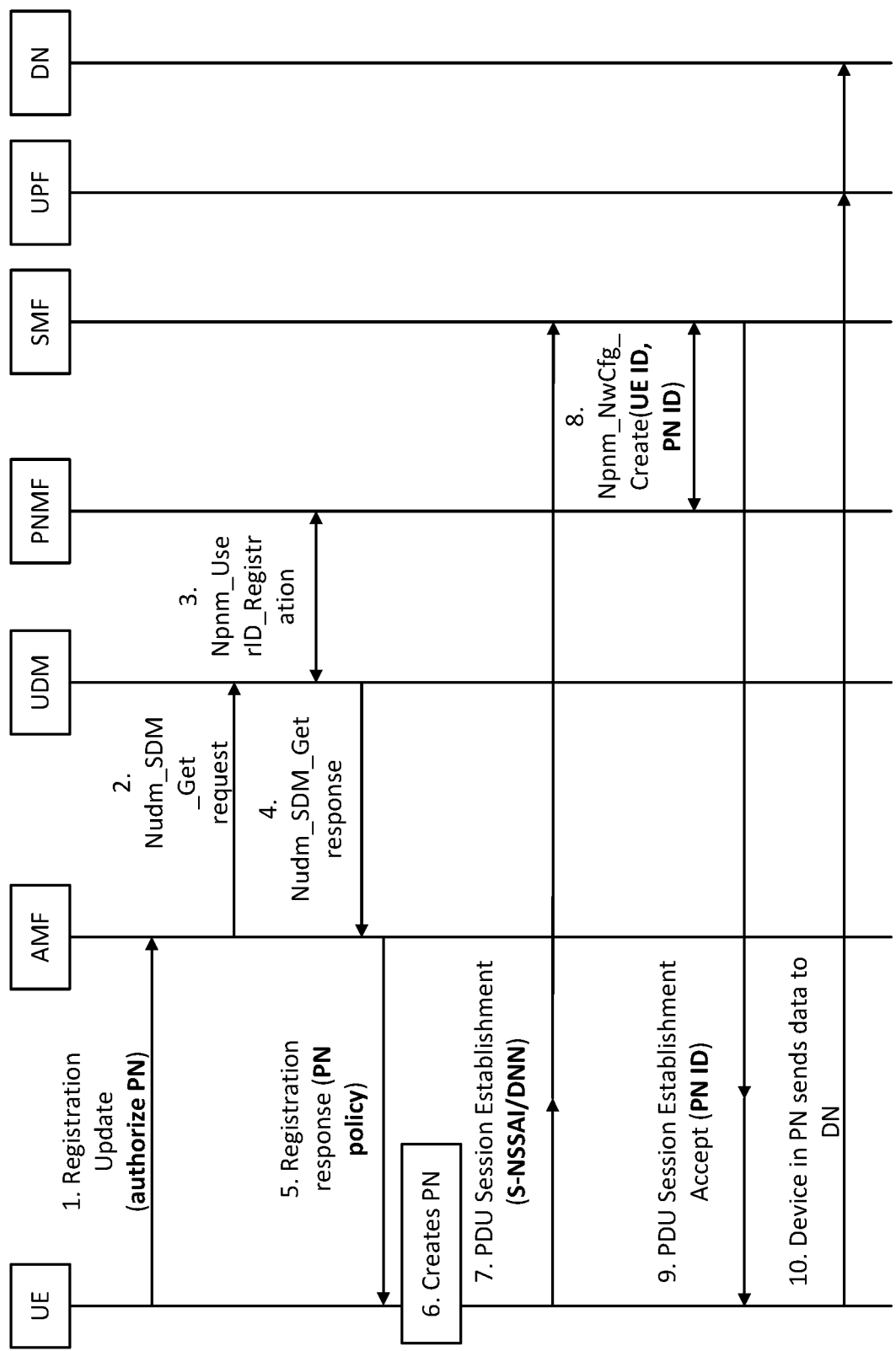
FIG. 2 shows an example method for personal network authorization request and creation.

FIG. 2 shows a method which may be performed by a WTRU, such as a UE, to request, from a mobile network or core network, authorization for creating personal networks. The method of FIG. 2 may be performed in a network having the architecture illustrated in FIG. 1 and described above, or in any of the network architectures illustrated in FIGS. 10A-E. After being granted authorization, the method may enable the UE to create a personal network locally and to cause a PDU session for the personal network to be established with the core network. For example, the UE may request the establishment of the PDU session. The UE may enable members of the personal network to send data associated with the personal network using the PDU session.

In step 1 of FIG. 2, a WTRU, such as a UE, may send, to a core network, a request for authorization to create and manage a personal network of one or more devices. For example, a user or homeowner may desire to create a personal network consisting of home automation devices, many of which may be non-3GPP devices or 3GPP devices without a SIM card or without a subscription. The user or homeowner may initiate a request via an application running on a UE, which may cause the UE to perform a registration update procedure in which the UE sends a request to the core network for authorization from the mobile network operator to create one or more personal networks. The registration request may include an indication that the UE is requesting authorization to create and manage the one or more personal networks (e.g., an authorize PN indicator). Additional, the request may comprise a value indicating a number of user identities the user and/or UE requires for provisioning one or more devices of the personal network. Alternatively, or in addition, the request may comprise a list of device types or device capabilities and, for each listed device type or device capability, an indication of the number of user identities the WTRU requires for devices of the listed device type or device capability.

An ME part of the UE may trigger this request when an Application in the TE part of the UE invokes an AT Command. The AT Command may indicate to the ME that the Application is requesting authorization of a PN and indicate the number of desired user identities.

In step 2, the AMF may perform an Nudm_SDM_Get request to the UDM to check that the UE is authorized to create personal networks and may include the authorize PN indicator, and the value indicating how many user identities are requested by the user and/or UE, or the list of device types or device capabilities the number of devices for each device type or device capability for which user identities are being requested.

In step 3, the UDM may check that the UE's subscription information allows the UE to create personal networks and if allowed, the UDM may performs an Npnm_UserID_Registration service operation to the PNMF to be provided with a pool of user identities for the UE. The UDM may also include the value indicating how many user identities are requested. Alternatively, the UDM may include the list of device types or device capabilities with the number of devices of each device type or device capability for which user identities are being requested. The UDM may receive the outputs of the Npnm_UserID_Registration request as indicated above, including a pool of user identities, DNN(s), and/or S-NSSAI(s) for use in creating and managing the one or more personal networks.

In step 4, the UDM may send a response to the AMF. If the UE is authorized to create personal networks, the response may include a PN policy comprising one or more of: an indicator that signals that the UE is allowed to create personal networks, one or more S-NSSAIs allowed for the personal networks, one of more DNNs with which to create PDU sessions for the personal networks, a pool of user identifiers for use to provision to non-3GPP devices or 3GPP devices without SIM card or without subscription in the personal networks, a value representing the maximum number of personal networks authorized for the UE, and/or a list of personal network identifiers/prefixes to assign to the personal networks, among other information. Note the list of user identities provisioned in the policy may also provide the limit on the number of non-3GPP devices or 3GPP devices without SIM card or without subscription that could be members of the personal networks. However, this limit may not apply to UEs joining the personal networks as they already have a user subscription with the mobile network operator. If more user identities are required, the UE may need to send another request to be provisioned with more user identities, and hence, allow for more non-3GPP devices or 3GPP devices without SIM card or without subscription to be members of the personal networks.

In step 5, the UE (i.e., WTRU) may receive, from the core network, a message comprising an indication that the WTRU is authorized to create and manage the personal network and further comprising the policy associated with the personal network, which may comprise a data network name (DNN). For example, the AMF may return a registration response to the UE. The response may comprise a PN policy (as discussed in step 4) that the UE may use to manage the personal networks that are created. The policy may comprise one or more S-NSSAIs that the personal networks may use and/or one of more DNNs which are associated with PDU Sessions that route PN traffic. Other information as described in step 4 may also be part of the PN policy returned to the UE.

The ME part of the UE may provide the PN policy to an application as a response to the AT Command that was invoked in step 1.

In step 6, the UE may use the PN policy returned in the registration response to start creating and managing personal networks. This process will be further described hereinafter.

In step 7, the UE (i.e., WTRU) may cause, using the DNN, establishment of a protocol data unit (PDU) session for sending data associated with the personal network to the core network. For example, once a personal network has been created or during the process of creating the personal network, the UE may cause a PDU session to be created for use in sending personal network-related data to the network. The PDU session may be caused to be established by sending a PDU Session Establishment message to the network using one of the S-NSSAI and/or DNN provided by the PN policy returned in the registration response or configured in the UE. For example, a slice may be part of the Configured NSSAI, and the slice type may indicate personal network traffic. The PDU session provides access to the 5G network for all members of the personal network. In addition, the UE may also include a personal network identifier in the request to identify the personal network and a human-readable description for the personal network. The identifier may be used for discovery purposes and to enable communication with devices in the personal network over the 5G network.

The PDU Session Establishment may be triggered by an application in the TE part of the UE invoking an AT Command to establish a PDU Session. The AT Command may include a DNN and/or S-NSSAI that was provided in step 205.

In step 8, the SMF may contact the PNMF to create a context for the personal network, e.g., performs an Npnm_NwCfg_Create service operation. The context created in the PNMF may contain configuration and management aspects for the personal network such as the PN identifier, UE or user identifiers of the PN members, identification of PN member(s) with management and/or gateway capability, PDU session ID including associated S-NSSAI and/or DNN, network configuration parameters for the PN, and other information associated with the personal network. The information stored in this step may be considered management data that is used by a member with management capability to manage the personal network and it may also serve as backup network configurations that allows a user or homeowner to quickly recreate the personal network should a member with management capability fail or network configuration information gets corrupted and the personal network becomes non-operational. The management data may also be used to perform device upgrades by replacing a member with management capability with a newer device with management capability and restoring the management data on the new device.

In step 9, the UE may receive, from the core network, a message indicating establishment of the PDU session. For example, the SMF may respond with a PDU session establishment accept response and may include an identifier to associate with the personal network if the UE did not provide an identifier in the request. The personal network identifier may be associated with the PDU session ID or the identifier may be separate from the PDU session ID. The personal network identifier may be utilized to identify a specific personal network when a UE or some other entity wants to communicate to the network over the 5G network. The SMF may also override the identifier provided by the UE with a different identifier for the personal network or the PN ID may be obtained from the PNMF using the Npnm_NwCfg_Create service operation.

In step 10, the UE may send data from members of the personal network to the 5G network (e.g., core network) using the established PDU session specified by the DNN. This process will be further described hereinafter.

Typically, personal networks are created in the home, office, or shop to be shared among members of a household or business. As such, user subscriptions may be linked together in order for other users to get notifications for when personal networks are created. For example, a homeowner may request from a mobile network operator to link user subscriptions of all household members in the family plan together, so each user gets notified whenever a personal network has been successfully created and the user is allowed to access the personal network. The notification may be in the form of a UE Configuration Update that contains information about the created personal network, such as the PN ID, requirements (e.g., S-NSSAI/DNN) for establishing a PDU session to access the personal network, and a human-readable description of the personal network. Similarly, a business administrator may request all colleagues within the business receive notifications for personal networks created for the business. The users may subsequently use the information from the UE Configuration Update message to access the personal network.

The user or homeowner may also request from the mobile network operator to share the authorization of creating and managing personal networks with other household members during the registration procedure or through out of band communications with the network operator, e.g., when linking the user subscriptions. In those cases, the UE Configuration Update procedure may also provide a PN policy to the user. The PN policy will include user identities associated with the corresponding user subscription for tracking and charging purposes. To ensure the personal networks created by users are accessible to all household members, the PDU session requirements in the PN policies of all household members may be the same. Note that while some information in the PN policy provided to household members may be the same, other information such as maximum number of personal networks authorized may be different depending on configurations the user or homeowner provides to the mobile network operator.

UE Management of Personal Network Lifecycle

After a UE receives the personal network policy from the mobile network operator that provides authorization and other information required for the UE to create and manage personal networks, the UE can then start the process of creating and managing one or more personal networks. The lifecycle of a personal network includes the process of both device and service discovery, user identity disbursement, the creation and management of the personal networks, and finally the disbandment of the personal networks. Some personal networks may be short-lived and temporary in nature, e.g., a gaming session lasting for a few hours, while other personal networks may be perpetual or limited by the lifespan of the devices, e.g., home automation networks. Within the personal networks and from 3GPP TR 22.859, members may be classified as having gateway capabilities, management capabilities, and device specific capabilities, such as providing data or receiving commands. The gateway capability allows members of the personal network to utilize the services of the 5G network while management capability enables a member to create and manage the personal networks. Note that a device may have both gateway and management capabilities.

Personal Network Discovery

Figure 3:
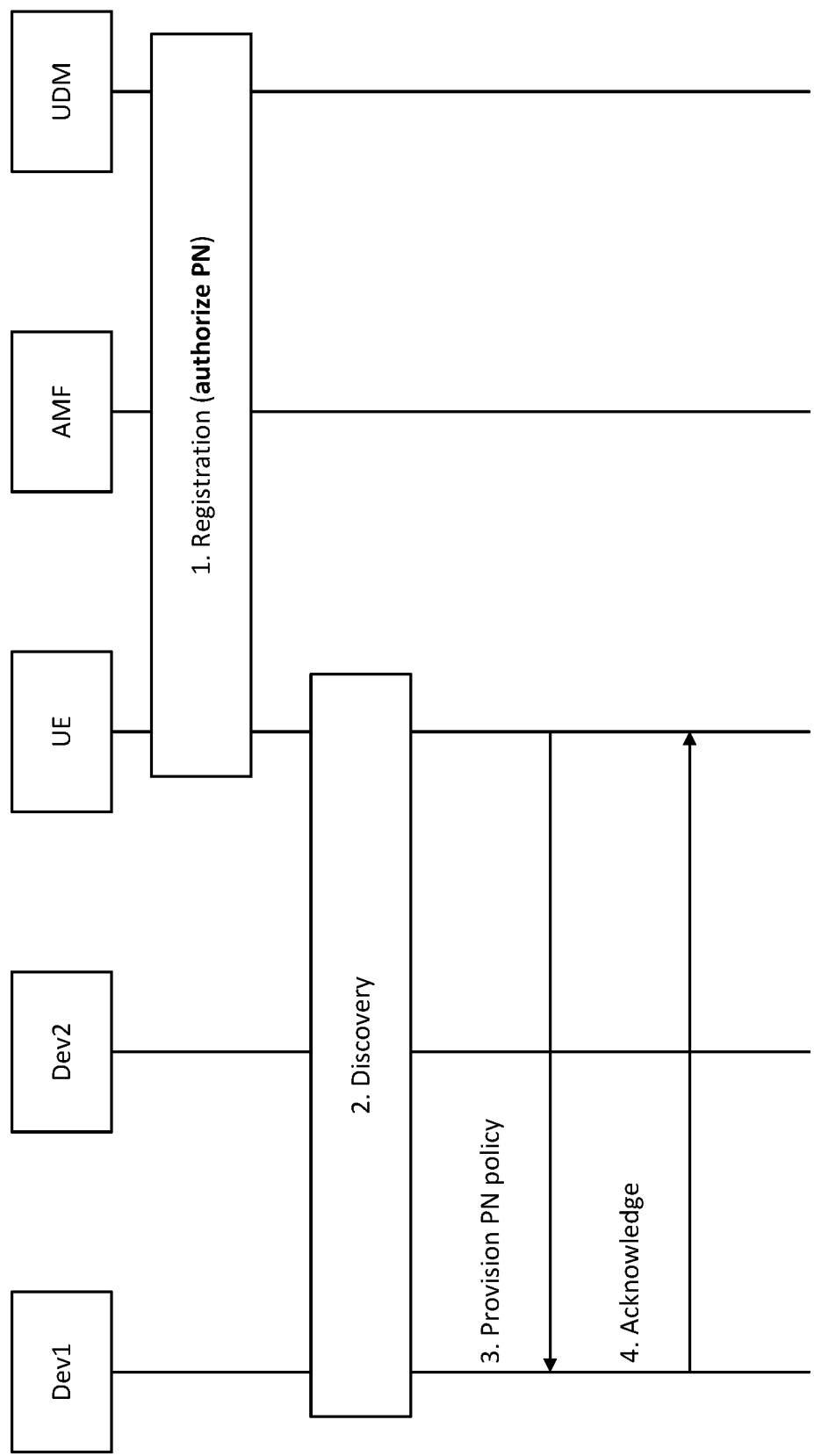
FIG. 3 shows an example method for personal network user identity management.

Prior to the creation of personal networks, devices may need to perform discovery to find what devices are available and what their capabilities are. The discovery mechanisms employed depends on the types of device and the access network the device supports. Regardless of what discovery mechanisms are used, the devices must use the same mechanism and must be able to communicate with each other using the same access network. However, information about device capability pertinent to personal networks may need to be exchanged to assist in the creation of such networks. The following is a list of information that may be exchanged during discovery:

Device capability, e.g., gateway, management, routing, device specific, etc.
    Device identifier (3GPP devices will use 3GPP assigned identifier; non-3GPP devices or 3GPP devices without SIM card or without subscription will use manufacturer identifier)
    Device information, e.g., manufacturer, model, serial number, device type, battery level, etc.
    Power source, e.g., mains, battery, solar powered, etc.
    Availability status, e.g., online, offline, sleep state, etc.
    Access to 5G network connectivity
    Nearest neighbors
    Network topology
    Supported protocols
    Security requirements
    Mobility status, e.g., fixed, mobile, etc.
    Disband network options User Identity Management Once a UE is authorized to create personal networks and has been provisioned with a PN policy, the UE may start distributing the provisioned user identities to other devices that have management capability. For example, the UE may provision one or more non-3GPP devices, of the one or more devices of the personal network, with the one or more user identifiers. This may be done manually by the user or homeowner via an application on the UE or it may be accomplished in conjunction with the discovery procedure as shown in FIG. 3. In addition, the provisioning of a pool of user identities may also be accomplished during the creation of a personal network or when adding a member to the personal network. Note that the method of FIG. 3, may be performed in combination with the method of FIG. 2.

In step 1 of FIG. 3, the UE may perform a registration with the 5G network and obtain authorization for creating personal networks as described above. As part of the registration procedure, the UE may be provisioned with a PN policy in which a pool of user identities is provided to the UE. The user identities may then be assigned to non-3GPP devices or 3GPP devices without SIM card or without subscription during the creation of personal networks.

In step 2, both service and device discovery are performed by devices and UEs that may become members of the personal networks. Existing mechanisms are utilized during this step. However, capability exchange may require additional information specific to personal networks to be shared among the devices and UEs such as those previously identified for personal network discovery.

In step 3, the UE, after discovering the capabilities of the devices, makes a determination to provision a PN policy to Dev1, which has management capability. The PN policy includes a set of user identities and possibly a maximum number of personal networks Dev1 may create. In addition, other information such as PN IDs of other personal networks, information of other devices with gateway or management capabilities, and routing policies may also be provided. Dev1 may be either a UE or a non-3GPP device, or a 3GPP device without SIM card or without subscription and has the added capability of managing personal networks by provisioning user identities to non-3GPP devices, or 3GPP devices without SIM card or without subscription, and adding members to or removing members from the personal networks among other management functions. The UE may have made the determination based on information provided by Dev1 during discovery.

In step 4, if the device is capable and willing to operate as a device with management capability, the device responds with an acknowledgement to the UE.

The procedure of FIG. 3 shows a UE provisioning a PN policy to a device with management capability. The procedure can be extended to a device with management capability provisioning PN policies to other devices with management capability.

Personal Network Creation and Member Addition

Figure 4:
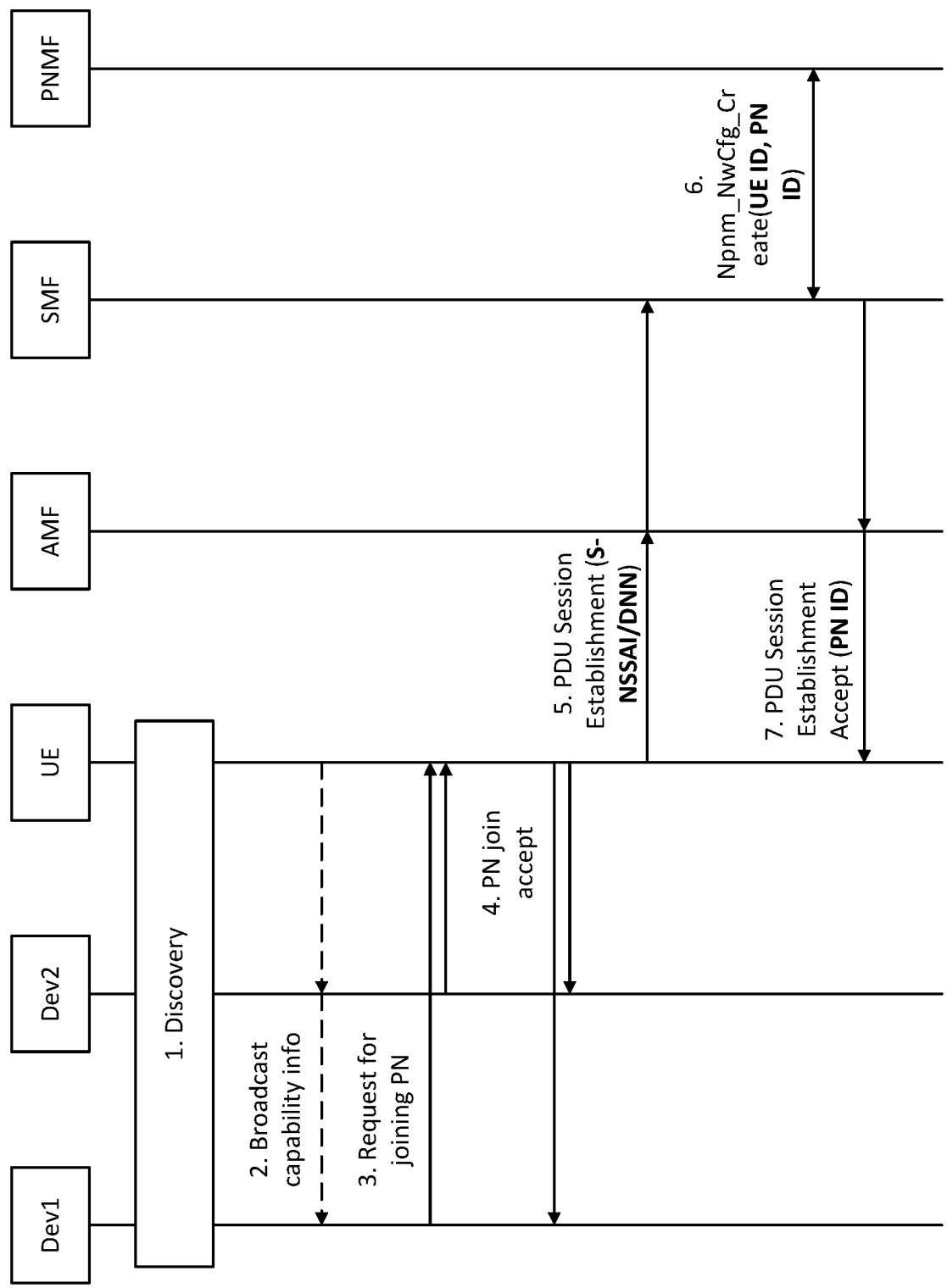
FIG. 4 shows an example method for personal network creation or member addition.

The creation of a personal network follows the discovery procedure. Information may be broadcast or multicast to nearby devices providing capability exchange to assist nearby devices with making the determination on whether to join the personal network. If interested, the nearby devices proceed to join the personal network by sending a join request. FIG. 4 shows an example method for creating a personal network or for adding a member to an existing personal network. Either Dev1, Dev2, or the UE may initiate a discovery procedure to locate each other after gaining connectivity to a network. Then or during the discovery process, capabilities are exchanged and interested devices send join requests to form the personal network. Note that the method of FIG. 4 may be performed in combination with any or all of the methods of FIGS. 2-3.

In step 1 of FIG. 4, discovery may be performed by the devices interested in joining a personal network as previously described. In this example, the UE may provide both gateway and management capabilities, Dev1 is a non-3GPP device or a 3GPP device without SIM card or without subscription with management capability, and Dev2 is a non-3GPP device or a 3GPP device without SIM card or without subscription providing device specific functionality. The discovery may be triggered upon the power up of Dev1 and Dev2 or initiated by the user or homeowner using external mechanisms, such as pushing a button on a device or scanning a code on the device packaging.

In step 2, if necessary, the UE may broadcast or multicast its capability to nearby devices to indicate the opportunity to join a personal network. The UE may include information as previously described for the discovery process if this information was not already provided during the previous step.

In step 3, Dev1 and Dev2 are interested in joining the personal network and send join requests to the UE. In the request, Dev1 and Dev2 may include its capabilities and other information, such as device identifier, manufacturer, model number, power source, mobility status, supported protocols, security requirements, etc.

In step 4, after receiving the join requests, the UE, using its management capability, accepts the join requests and returns a response each to Dev1 and Dev2 with an indication showing the status of the join request. The UE may make this determination based on the PN policy authorizing it to create personal networks. The UE provisions Dev1 and Dev2 with a user identity since they are non-3GPP devices or 3GPP devices without SIM card or without subscription. The response may also include other information about the personal network such as the name or identity associated with the personal network; the identity and contact information of devices with gateway and management functionalities; the identity, contact information, and capabilities of other members of the personal network; a list of neighbors and their member status and availability; broadcast/multicast information; a renewal timer; network disbandment options, etc.

In step 5, if necessary, the UE establishes a PDU session with the network operator to provide access to the 5G network for members of the personal network. The PDU session request may include an S-NSSAI and/or DNN as specified by the PN policy and also a PN identifier for the personal network. In addition, configuration information about the personal network may also be provided by the UE to assist the 5G network to manage the personal network. Information such as the members of the personal network and their identifiers, the identification of members with management and/or gateway capability, and local network configuration parameters and options may be provided. Note that a PDU session may have already been previously created prior to the device join requests, e.g., when the personal network was initially created. In this case, a PDU Session Modification procedure may be requested.

In step 6, the SMF makes an Npnm_NwCfg_Create request to the NPMF to save management data for the personal network. The request may include the UE/subscription identifier, a PIN identifier, and other information about the personal network, such as the IDs of members and their capability, etc. In addition, local network configuration of the personal network may be provided to the PNMF. The configuration information may include network type, WLAN SSID, BSSID, security mechanism, password, IP settings, DNS settings, MAC addresses, pairing codes, refresh interval, data usage limit, maximum number of members, etc. If the personal network was previously created, the SMF executes an Npnm_NwCfg_Update request instead to update the management data of the personal network.

In step 7, the network operator accepts the PDU session establishment request and may return a PN identifier in the response to the UE. The PN identifier may be used to identify this personal network from other personal networks and may be used for routing purposes between personal networks. In addition, the PN ID may be used for discovery purposes and for other UEs to access the members associated with the PN ID over the 5G network.

The example method of FIG. 4 shows not only a UE creating a personal network but can also apply to the UE adding a member to the personal network. In addition, the method may also be extended to a device with management capability but only if the device also has gateway capability. For a device with only management capability, the PDU session establishment step will not be executed unless there is also a member with gateway capability within the personal network. In the example method of FIG. 4, Dev1 is not able to establish the PDU session but it is able to add or remove members from the personal network and also perform other management functions, such as provisioning user identities to non-3GPP devices or 3GPP devices without SIM card or without subscription.

Personal Network Management

Figure 5:
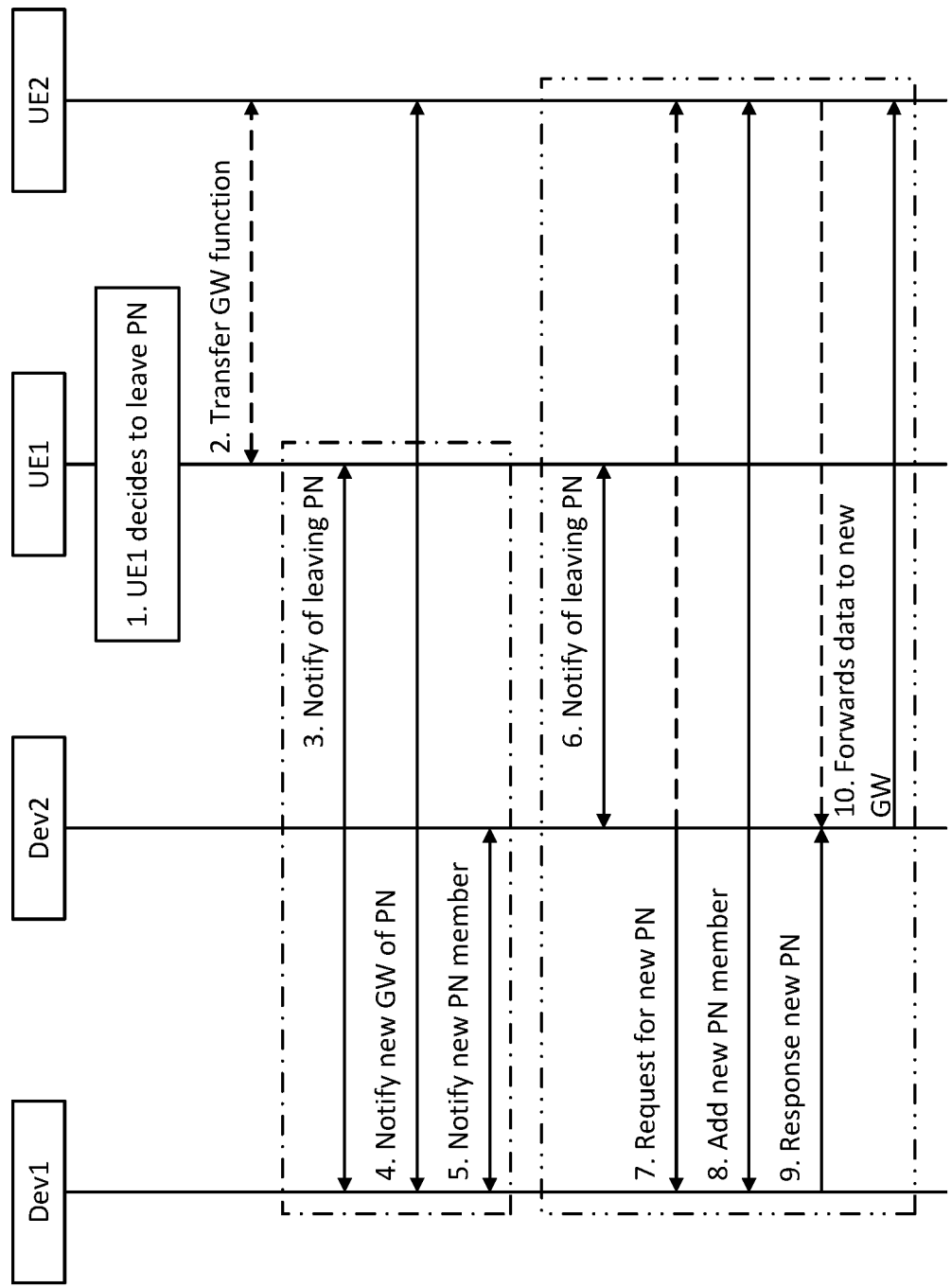
FIG. 5 shows an example method for personal network management gateway transfer.

Management of personal networks may consist of various methods, such as adding and removing members, the transfer of gateway or management capabilities from one device to another, management data backup, network topology or configuration update, and device capability update. FIG. 5 shows an example of a personal network management method in which a UE transfers gateway capability to another UE and informs the rest of the members of its personal network of the change. In this example, UE1 is serving as the gateway for the personal network it is leaving while UE2 serves as the gateway of another personal network and is targeted to provide gateway functionality in place of UE1. In this example, Dev1 is a non-3GPP device or a 3GPP device without SIM card or without subscription with management capability and Dev2 is also a non-3GPP device or a 3GPP device without SIM card or without subscription with device specific functionality in the personal network with Dev1 and UE1. Note that the method of FIG. 5 may be performed in combination with any or all of the methods of FIGS. 2-4.

In step 1 of FIG. 5, UE1 may be a smartphone belonging to a user or homeowner, who is leaving the home or the vicinity of the personal network.

In step 2, the user or homeowner may optionally initiate a gateway function transfer to UE2 in which information about personal network 1 is conveyed to UE2. Information such as personal network name or identifier, a list of members of the personal network and their associated identifier, PDU session information such as ID, S-NSSAI and/or DNN, and other personal network configurations and options. UE2 acknowledges UE1 about becoming the new gateway for personal network 1 and may include the name or identifier of personal network 2 and a list of members in personal network 2. As an alternative, the 5G network may also initiate the gateway function transfer to UE2 upon detecting UE1 leaving the personal network. As part of the creation of the personal network, the UE provided the 5G network with configuration information of the personal network and the 5G network uses this information to manage the personal network when necessary. In this case, the 5G network detects the UE leaving the personal network, e.g., the UE performs a mobile update procedure, and triggers a UE Configuration Update procedure to transfer the gateway functionality to UE2. During this procedure, the 5G network may provide UE2 with the saved management data such as the personal network identifier, the members of the personal network and their associated user identity, the identifiers of members with management and/or gateway capability, PDU session ID with associate S-NSSAI and/or DNN, network configuration parameters, etc. UE2 then proceeds to add the members provided by the 5G network separately (this is not shown in the figure).

In step 3, UE1 sends a notification to Dev1 informing Dev1 that UE1 is leaving the personal network. The notification message may indicate whether a new gateway is available to serve personal network 1 (e.g., if step 502 was successful) with the name or identifier of the new gateway if one is available. The contact information for the new gateway may also be provided.

In step 4, Dev1 contacts UE2 to transfer gateway functionality for personal network 1 to UE2 if UE1 had not provided information about a new gateway in step 502. This step is omitted if UE1 provided information in step 503 about UE2 serving as the new gateway for personal network 1.

In step 5, Dev1 notifies Dev2 and other members of the personal network of a change to the personal network, e.g., there is a new member that serves to provide gateway functionality for the network. The notification may also include information that UE1 is no long serving as a gateway for the personal network. Any other management data are conveyed to the members of the old personal network 1 at this time including the name or identifier of the new personal network.

In step 6, as an alternative to steps 503 to 505, UE1 may instead contact Dev2 and other members of the personal network directly using broadcast, multicast, unicast, or a combination thereof. UE1 may provide the name and identifier of UE2 and also the contact information of UE2 if this information is available. If the information is not available, UE1 may include a timer value for when UE1 will cease to provide the gateway functionality for the personal network.

In step 7, in response to being notified, Dev2 may send a request to Dev1 requesting for inclusion into a new personal network. If UE1 had provided information about UE2, then Dev2 may instead contact UE2 directly (as indicated by the dashed line) and request to be added to personal network 2.

In step 8, Dev1, serving as a member with management capability, sends a request to UE2 to add Dev2 as a member of personal network 2. Dev1 may also send the request to another device that is serving as a member with management capability of personal network 2. The assumption is that members with either management or gateway capabilities are able to provide user identities and therefore, is able to manage personal networks. Provisioning and management of user identities is one of the main features in the management of the personal networks.

In step 9, Dev1 returns a response to Dev2 indicating the status of Dev2's membership in personal network 2. Alternatively, UE2 may respond to Dev2 with information about membership in personal network 2 if Dev2 had sent a request for joining personal network 2.

In step 10, Dev2 forwards data to the UE2, the new gateway for personal network 1. Note that in this case, UE2 serves as the gateway for two personal networks. UE2, therefore, is able to route data between members of personal network 1 and members of personal network 2 without having connectivity to the 5G network. However, members of either personal networks are not able to send data to the 5G network and other UEs or other devices outside the personal networks cannot access members of the personal networks over the 5G network without UE2 have connectivity to the 5G network.

Note that even though UE1 leaves the personal network in the example method of FIG. 5, it can still access members of the personal network using the PDU session that was initially established for the personal network. Since UE2 is using the same PDU session requirements as UE1 to establish the PDU session, UE1 is able to access members of the personal network over the 5G network. In this case, the PDU sessions created by UE1 and UE2 have the same S-NSSAI and/or DNN values. The data network may be represented as a virtual twin of the personal network in the home. Therefore, the user is able to connect to the personal network wherever the user may be, whether at home or away from home, without any additional configuration or security settings. In addition, 3GPP security is provided for end-to-end communications.

Figure 6:
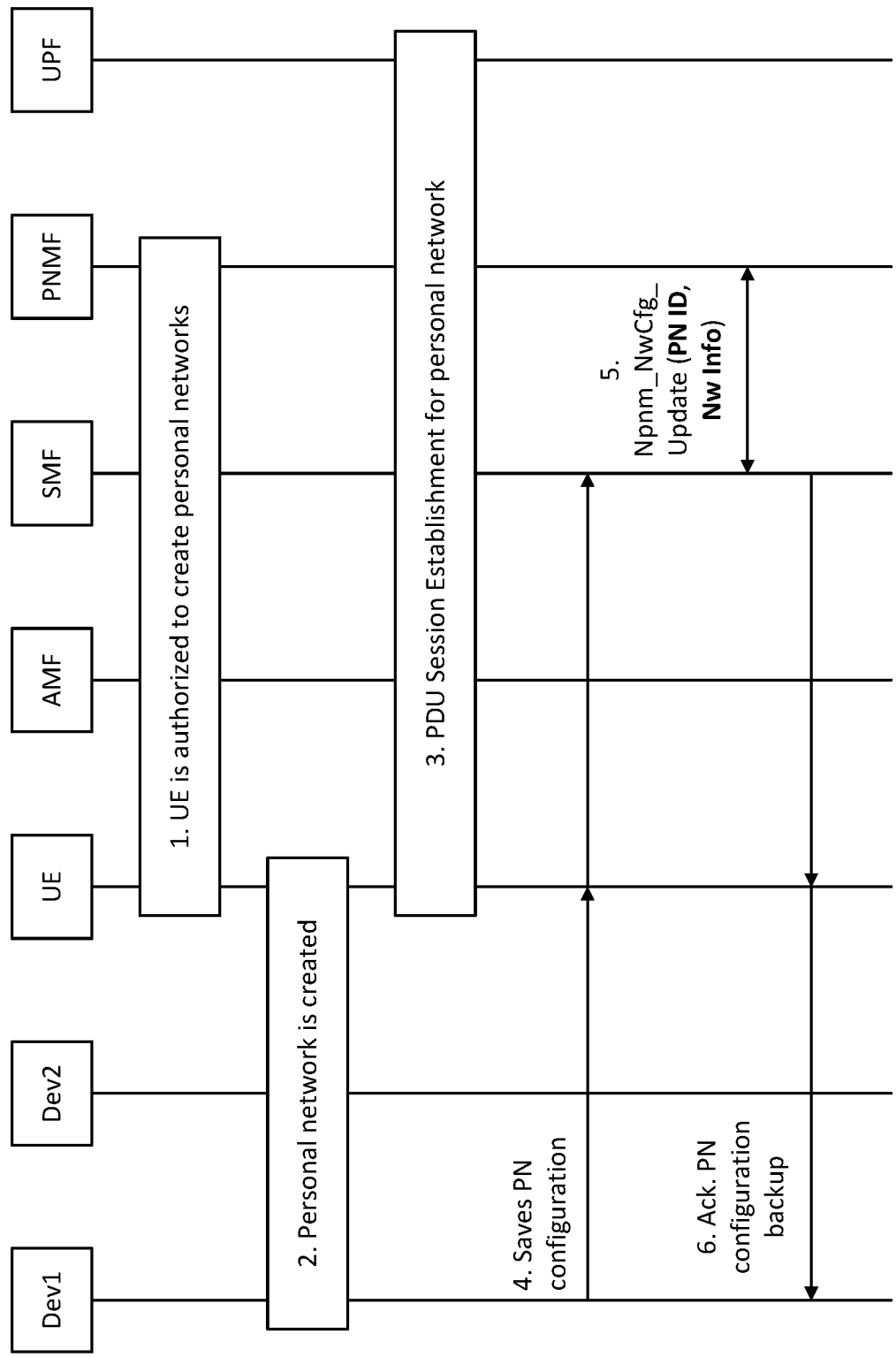
FIG. 6 shows an example method for personal network management data backup.

Once the personal network has been created and is operational for some time, there may be changes to the configuration of network parameters that the user or homeowner may want to save for backup purposes. An example is the user may want to replace a member with management capability with a new device while preserving the management data of the personal network. Another example is if the user has changed network parameters that may affect the operations of the personal network, for example such as a change to the network password. A request can be made by a member of the personal network with management capability to back up management data (e.g., network configuration) of the personal network as shown in FIG. 6. Note that the method of FIG. 6 may be performed in combination with any or all of the methods of FIGS. 2-5.

In step 1 of FIG. 6, a UE may make a request and be authorized by the 5G network to create personal networks as described above.

In step 2, a personal network is created which consists of the UE, Dev1, and Dev2. Dev1 is a member with management capability and the UE provides gateway capability for the personal network.

In step 3, the UE creates a PDU session using the PDU Session Establishment procedure as described above. Network configuration information and other management data may be saved in the PNMF with the PIN ID. Note that the PDU session may be established prior to the creation of the personal network locally so step 603 may occur before step 602.

In step 4, after some time or due to changes in network parameters of the personal network, Dev1 initiates a request to the UE to back up the management data for the personal network. The UE sends a request to the 5G network such as a PDU Session Modification request that includes the management data and the PN ID.

In step 5, the SMF executes an Npnm_NwCfg_Update operation to the PNMF with the PIN ID and the management data provided by the UE. The PNMF returns a response acknowledging the update.

In step 6, the SMF acknowledges the update of the PN management data stored in the PNMF to the UE, which returns a response to Dev1.

Previously, it was mentioned that user subscriptions for a household and/or business may be linked together in order for other users to get notification of the creation of personal networks. As part of the notification, information such as the PN ID and S-NSSAI/DNNs are provided to the UEs of the other users of the household and/or business. Upon receiving the information, the UE may then join a personal network and create a PDU session with the provided PN ID and S-NSSAI/DNN. The UE may create the PDU session for the purpose of accessing the personal network locally and remotely, or the UE may create the PDU session for the purpose of providing gateway capability for the personal network, or a combination of both.

Other management functions such as adding and removing members or updating the status of a member (e.g., battery level or sleep state) may be requested by all members while other management functions such as network topology update and routing information exchange may be limited to members with either gateway or management capability. These management functions may be made local for the personal network or they may be saved as management data in the PNMF.

Once management data for a personal network has been saved in the PNMF, a user or homeowner may retrieve the management data from the PNMF to recreate the personal network should a device with management capability fails and render the personal network inoperable. In this case, a UE may make a PDU Session Modification request to retrieve the management data saved in the PNMF. The SMF would then perform an Npnm_NwCfg_Get service operation to retrieve the management data from the PNMF and return the data to the UE.

Personal Network Disbandment

The disbandment of a personal network may be user initiated, due to the expiration of the renewal timer, or based on the removal of members of the personal network such that only one member remains. The creator of personal networks is typically a user or homeowner and hence, the user or homeowner may explicitly initiate the disbandment of the personal network. For example, the user or homeowner may initiate the disbandment of a personal network via an application running on the UE that serves as the gateway for that personal network. As a result, the disbandment may be an explicit request sent to all members of the personal network, e.g., using broadcast, multicast, unicast, or a combination thereof. The user or homeowner may disband a personal network for reconfiguration purposes or to upgrade all the devices in the personal network.

Another method for disbanding a personal network may comprise use of a renewal timer that may have been provisioned during a creation or modification procedure. The renewal timer may be provided to members of the personal network to indicate that a member may be removed from the network if no activity is initiated by the member before the expiration of the renewal timer. From the perspective of the member providing the gateway functionality, the renewal timer may represent that absence any traffic for the duration of the timer, the personal network should be disbanded. In other words, if there are no activity within the personal network for the duration of the renewal timer, the member with gateway capability may implicitly disband the network. An example for the use of the renewal timer is the case where a user has created a personal network for a gaming session with a set duration and a renewal timer is provisioned to all members of the personal network upon creation. After the gaming session completes, the user leaves without explicitly initiating a disbandment request and the personal network automatically disbands at the expiration of the renewal timer.

The need for disbanding a personal network may be due to the removal of members of the network until there is only one member remaining. This is another case of an implicit disbandment without the intervention of a user or homeowner. The members of a personal network maintain a list of remaining members in the network and if the list becomes empty over time, the member knows that it is the only remaining member and may disband the network if configured to do so. An example may be that the user or homeowner may have multiple personal networks and have removed all but one member of a particular personal network without realizing it. The remaining member then decides to disband the personal network. The decision to implicitly disband a personal network may be provided as a configuration option.

As part of the personal network disbandment, a UE may need to notify the PNMF that user identities associated with the personal network are no longer in use. The UE may perform the notification as part of a PDU session release procedure. In response, an SMF may perform an Npnm_NwCfg_Delete service operation to delete the management data saved for this particular personal network in the PNMF and possibly release the user identities associated with members of this personal network for assignment to devices in other personal networks. Note the release of user identities may be subject to operator policy, e.g., operator policy may specify that PNMF discard the user identities rather than allow for reuse.

Personal Network User Plane

When a member of a personal network needs to send data to the 5G network, traffic is routed within the personal network to a member with gateway capability and the member with gateway capability sends the data to a data network on a PDU session established for the personal network. As previously mentioned, the PDU session established for the personal network may be targeted to a particular S-NSSAI/DNN combination.

When a UE initially requests authorization from the mobile network operator to create personal networks, one of the information returned to the UE in the PN policy may comprise a DNN with which to create the PDU session. The DNN is the name of a data network user traffic is routed to for the PDU session. Thus far, the DNN has been used to associate with a PDU session that supports 5G access for the personal network. Due to the security implications of exposing personal networks to the internet, mobile network operators may want to design the data networks to reside within their network domain to offer an additional layer of security. In addition, network operators may offer value-added services within these data networks similar to how value-added services are provided in a service hosting environment of LTE systems. For example, a value-added service such as AI/ML models that process video captured from surveillance cameras within and outside the home may be used to alert the homeowner of abnormal events such as the fall of an elderly person or the detection of a broken window. Other value-added services may include data compression, service function chaining, and automatic notifications to authorized users or safety authorities.

Figure 7:
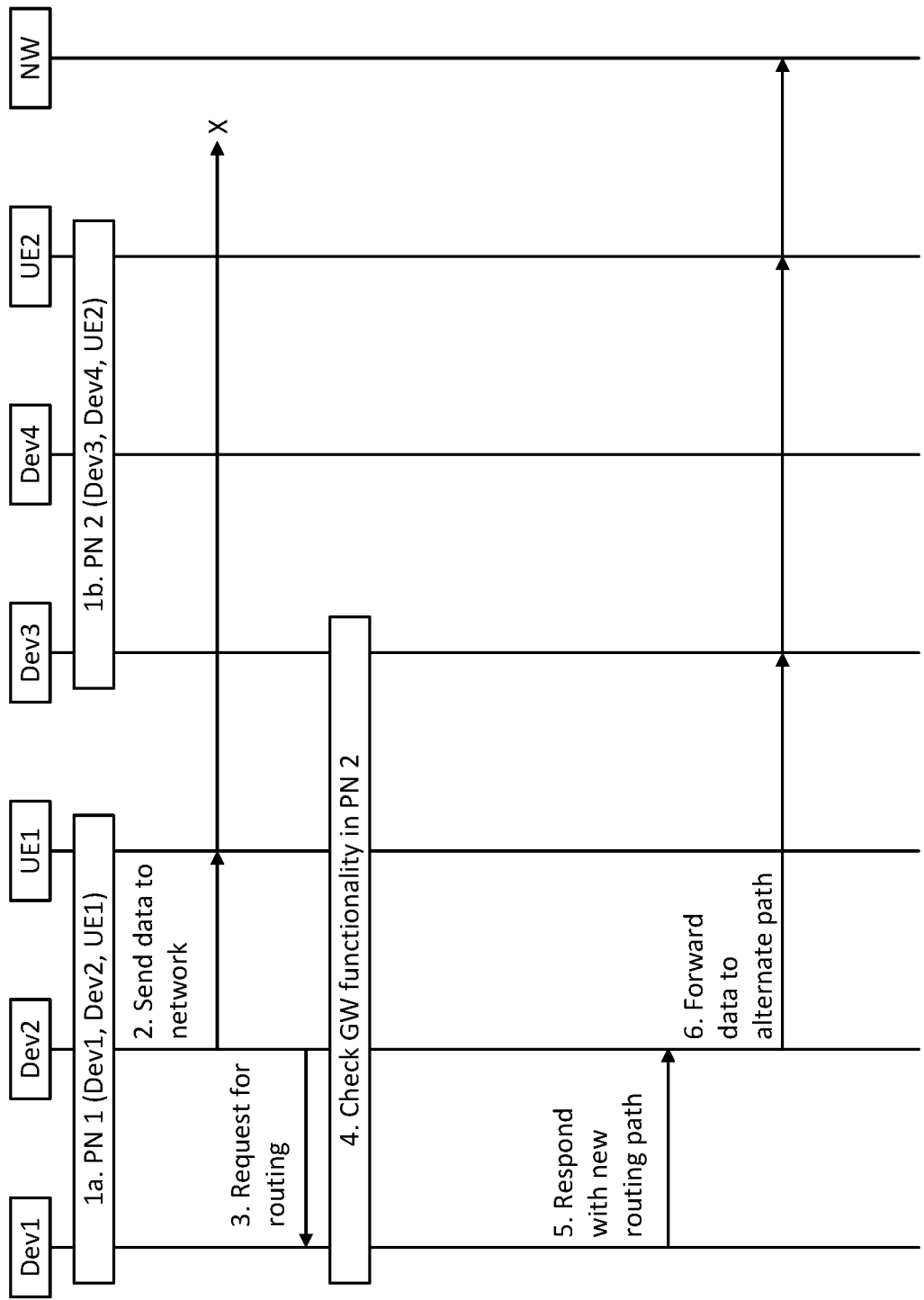
FIG. 7 shows an example method for requesting personal network re-routing.

Typically, a personal network would include at least one member with gateway capability to allow data to be sent to the 5G network. However, if the member with gateway capability has a weak connection or even loses its connection, then other members in the personal network will not be able to send data to the 5G network. In these cases, a member with management capability may be able to assist with finding another personal network in which data may be rerouted to the 5G network. FIG. 7 shows such an example method. Note that the method of FIG. 7 may be performed in combination with any or all of the methods of FIGS. 2-6.

In step 1 of FIG. 7, there are two personal networks: PN 1 which consists of Dev1, Dev2, and UE1 and PN 2 which consists of Dev3, Dev4, and UE2. The UEs in both personal networks provide gateway capability to their respective personal networks while Dev1 is a member with management capability for PN 1 and Dev3 has the corresponding function for PN 2. The 5G network is denoted NW.

In step 2, Dev2 has data to send to the 5G network and forwards the data to UE1. However, UE1 has an intermittent connection with the 5G network and is unable to send the data. After some delay, Dev2 discovers that UE1 is not able to send the data. For example, UE1 may have provided an indication informing Dev2 that the data cannot be sent or Dev2 detects via communications with UE1 that the data was not able to be sent.

In step 3, Dev2 makes a request to Dev1 to see if another path could be found to send the data. Dev2 may include information such as the data to be sent, the user identifier of Dev2, the requirements for the PDU session (e.g., S-NSSAI, DNN) in which to send the data, the state of UE1, etc.

In step 4, Dev1 is able to communicate with devices with management capability of other personal networks and therefore, checks with Dev3 to see if the gateway functionality is still functioning in PN 2. Dev1 may provide the requirements for the PDU session Dev2 is seeking to check if PN 2 can support re-routing data from Dev2. If necessary, Dev1 may need to add Dev2 to PN 2. In that case, Dev1 may need to add Dev2 as a member to PN 2 by providing the user identity of Dev2 and the PDU session requirements (e.g., S-NSSAI/DNN) to Dev3. Alternatively, Dev1 may re-route the data provided by Dev2 with the PDU session requirements received in step 703 if the personal networks allow such functionality, which may be determined during configuration of the personal networks. In this alternative, Dev1 performs step 706 on behalf of Dev2.

In step 5, if Dev1 receives a successful response from Dev3 (e.g., PN 2 supports sending data to the same S-NSSAI/DNN combination), Dev1 returns a response to Dev2 with a new routing path through PN 2. In the response, Dev1 may provide the contact information of Dev3 and other information required for Dev2 to forward data through PN 2. An example may be the PDU session ID to include with the data sent to Dev3.

In step 6, Dev2 forwards the data with the necessary information to the alternative path through Dev3.

Figure 8:
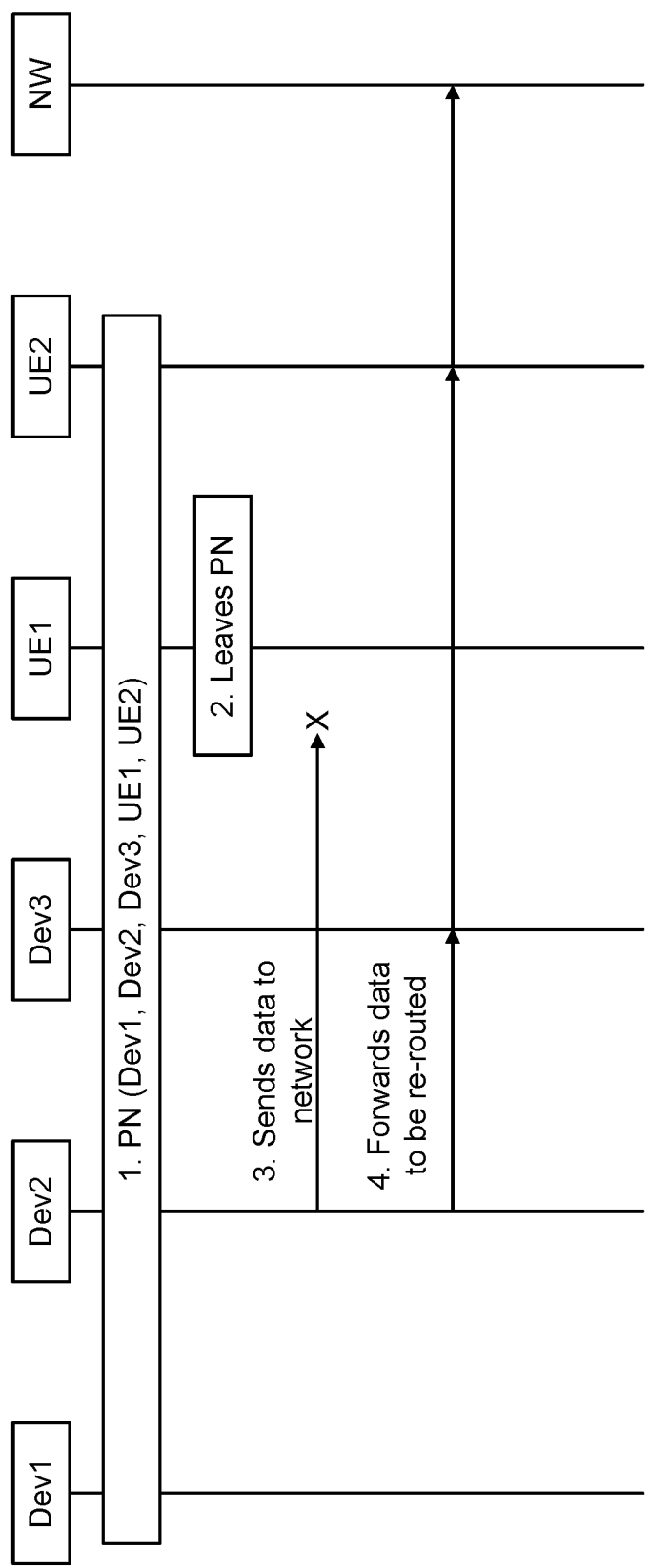
FIG. 8 shows an example of personal network re-routing with multiple gateways.

FIG. 7 shows the case in which only one UE provides gateway capability for the personal network. For more robust operations, it may be configured such that a personal network includes two or more UEs capable of providing gateway functionality for the personal network. This configuration adds redundancy to the personal network in case one of the UE is leaving the vicinity of the personal network or has intermittent or no connectivity to the 5G network. FIG. 8 shows an example of a personal network with access to the 5G network through multiple UEs with gateway capability. Note that the method of FIG. 8 may be performed in combination with any or all of the methods of FIGS. 2-7.

In step 1 of FIG. 8, the personal network consists of Dev1, Dev2, Dev3, UE1, and UE2. The UEs provide gateway capability while Dev1 and UE1 are members with management capability. Both UE1 and UE2 have established PDU session in support of the personal network, e.g., members of the personal network may use either UE1 or UE2 to send data to the 5G network. Each PDU session is established to the same data network as specified by the DNN. The 5G network is denoted NW.

In step 2, UE1 leaves the vicinity of the personal network, e.g., UE1 leaves the home where the personal network is. Due to the configuration of the personal network, UE1 does not need to inform the other members of the network that it is leaving.

In step 3, Dev2 has data to send to the 5G network and is configured to forward the data to UE1. After some time, Dev2 determines there is an issue to communicate with UE1 and based on configuration, decides to forward the data to another member of the personal network.

In step 4, Dev2 may decide to forward the data to Dev3 based on information in its local policy for the personal network. The local policy may have indicated to Dev2 that Dev3 is one of its nearest neighbors or is mains power and therefore will be able to buffer the data longer. Dev3 forwards the data to UE2, which then sends the data to the 5G network. Alternatively, Dev2 may also forward the data to Dev1, which serves as the member of the personal network with management capability. Being a member with management capability, Dev1 may have more information in its local policy of the personal network than Dev2. For example, Dev1 may have information that Dev3 has access to UE2 for routing data to the 5G network that Dev2 may not have in its local policy.

As previously described, once UE1 leaves the vicinity of the personal network as in the example of FIG. 8, it can no longer provide gateway access to the 5G network for members of the personal network. However, it is still able to access the data network with the established PDU session using the 5G network while away from the home. This is one of the main benefits of having support for personal networks in the 5G system. The user of the UE can access the personal network without any additional configuration or security settings. The same PDU session established to provide gateway functionality for members of the personal network in the home also offers access to the personal network while the user is away from the home without any additional configuration. Furthermore, the security mechanisms provided by the 5G network ensure privacy for the users of the personal networks.

Graphical User Interface

An example graphical user interface that may be displayed by one of the devices in a personal network is shown in FIG. 9. The GUI may provide pertinent information about the personal network, such as the PN ID, a listing of the members of the personal network, the user identifier associated with devices without a SIM card or subscription, and whether the device has management (e.g., MC) and/or gateway (e.g., GC) capability for the personal network. In addition, there is also a Network Configurations button that a user may select to view the network settings used for the personal network, e.g., the network type, WLAN SSID, BSSID, netmask, security mechanism, password, IP settings, DNS settings, MAC addresses, pairing codes, refresh interval, data usage limit, maximum number of members, etc. The information in the Network Configuration may be saved in the PNMF as part of personal network management data as previously described.

The GUI of FIG. 9 illustrates an example personal network in which there are multiple members with management capability and also multiple members with gateway capability. In fact, UE1 in this example has both management and gateway capability. In addition, Dev1, Dev2, and Dev3 are members that do not have 3GPP credentials or subscription and thus are assigned user identifiers. The devices may be non-3GPP devices or 3GPP devices without a SIM card or without a subscription with a mobile network operator, an example is a tablet without a SIM card that is used to manage the personal network.

Example Environments

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G." 3GPP NR standards development is expected to continue and include the definition of next generation radio access technology (new RAT), which is expected to include the provision of new flexible radio access below 7 GHZ, and the provision of new ultra-mobile broadband radio access above 7 GHz. The flexible radio access is expected to consist of a new, non-backwards compatible radio access in new spectrum below 7 GHZ, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein, and the methods illustrated and described above in connection with FIGS. 2-8 may be implemented or performed, in any combination, in connection with any of the example systems and devices illustrated and described below in connection with FIGS. 10A-10G.

Figure 10A:
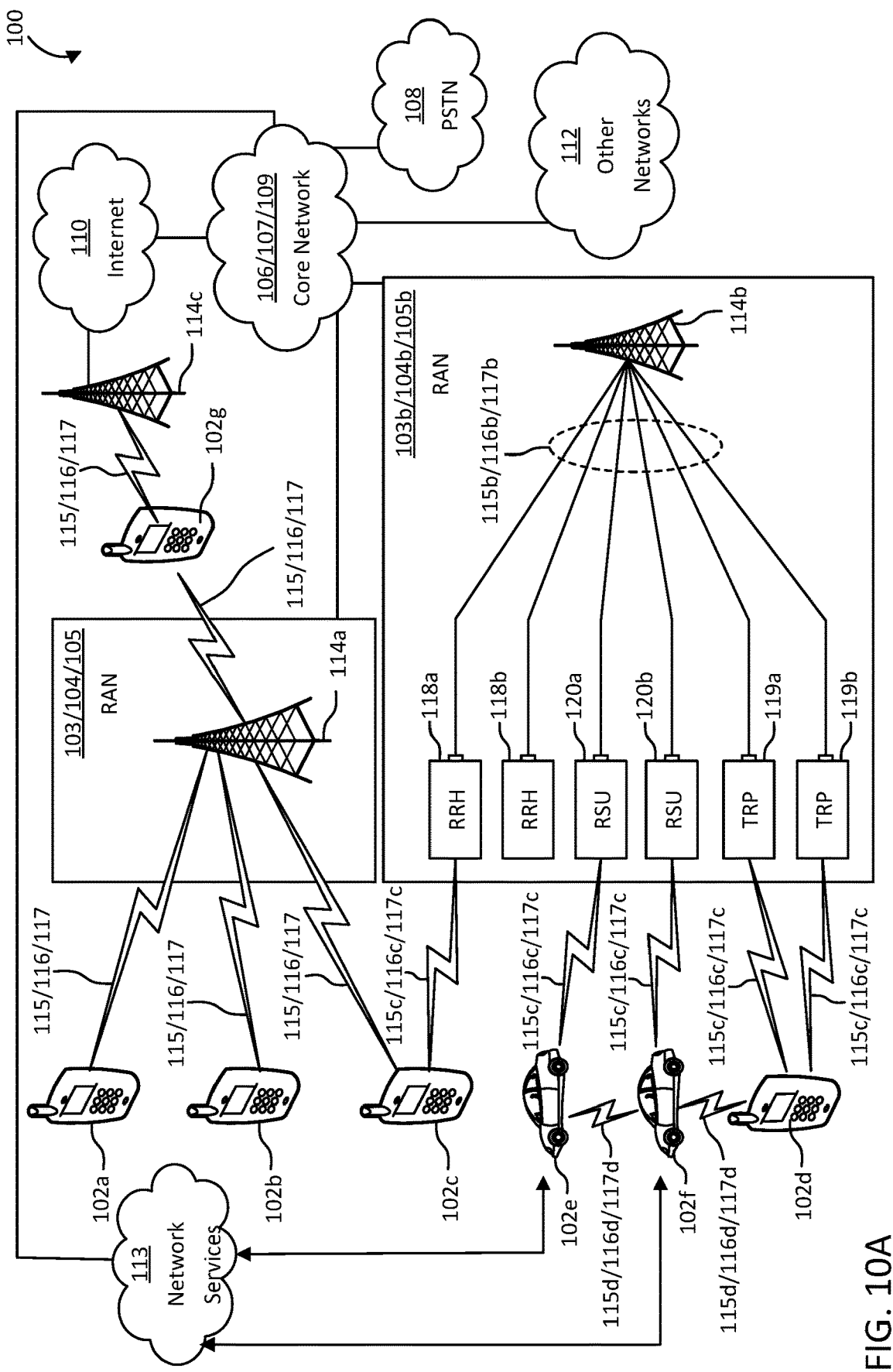
FIG. 10A shows an example communications system.

FIG. 10A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 10A, each of the WTRUs 102 is depicted in FIGS. 10A-E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 10A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 10A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 10A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VOIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 10A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 10A may be configured to communicate with the base station 114a, which may employ a cellular-based radio technology, and with the base station 114c, which may employ an IEEE 802 radio technology.

Although not shown in FIG. 10A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 10B:
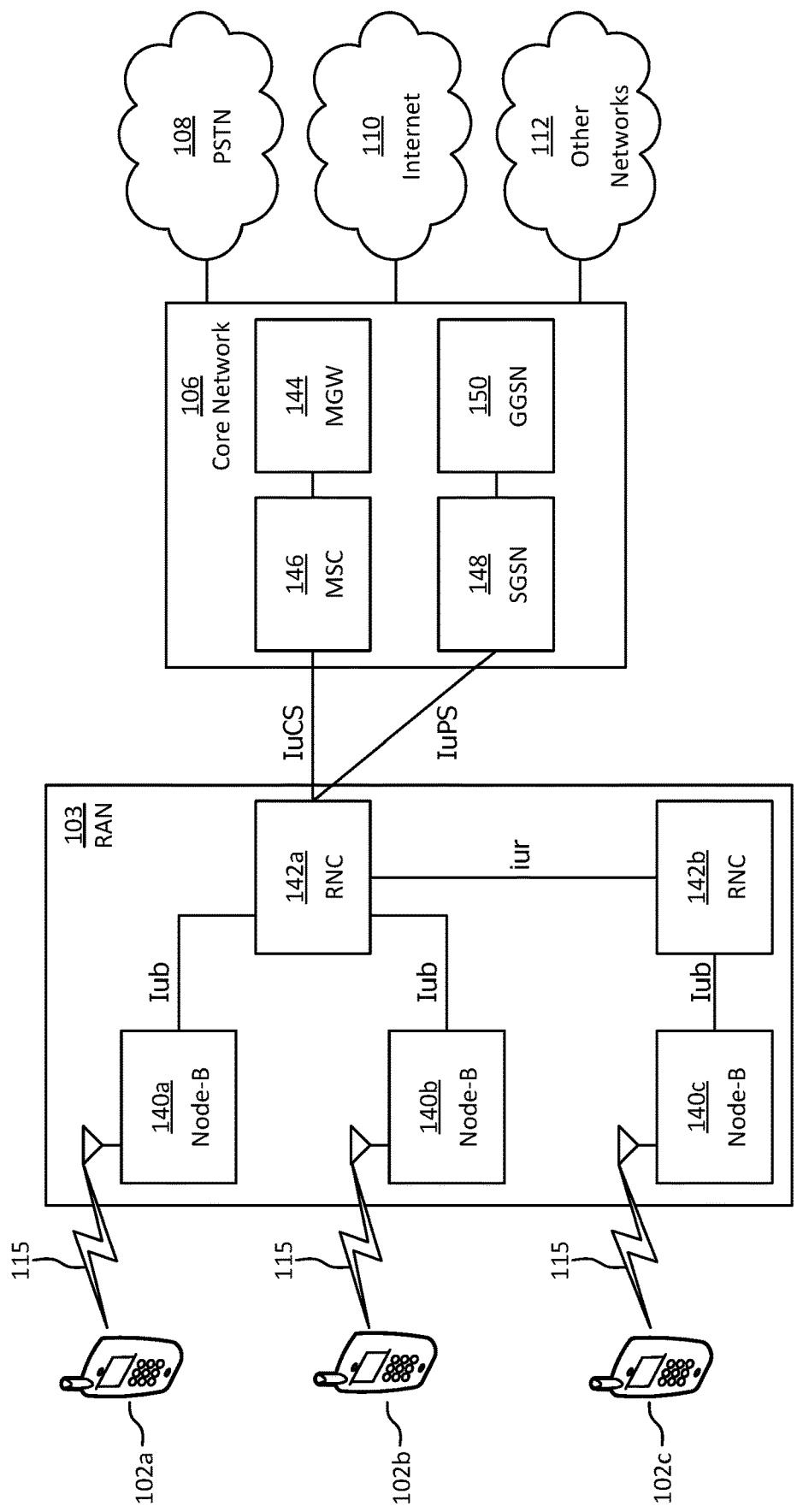
FIGS. 10B-D are system diagrams of example radio access networks (RANs) and core networks.

FIG. 10B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 10B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 10B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 10B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 10C:
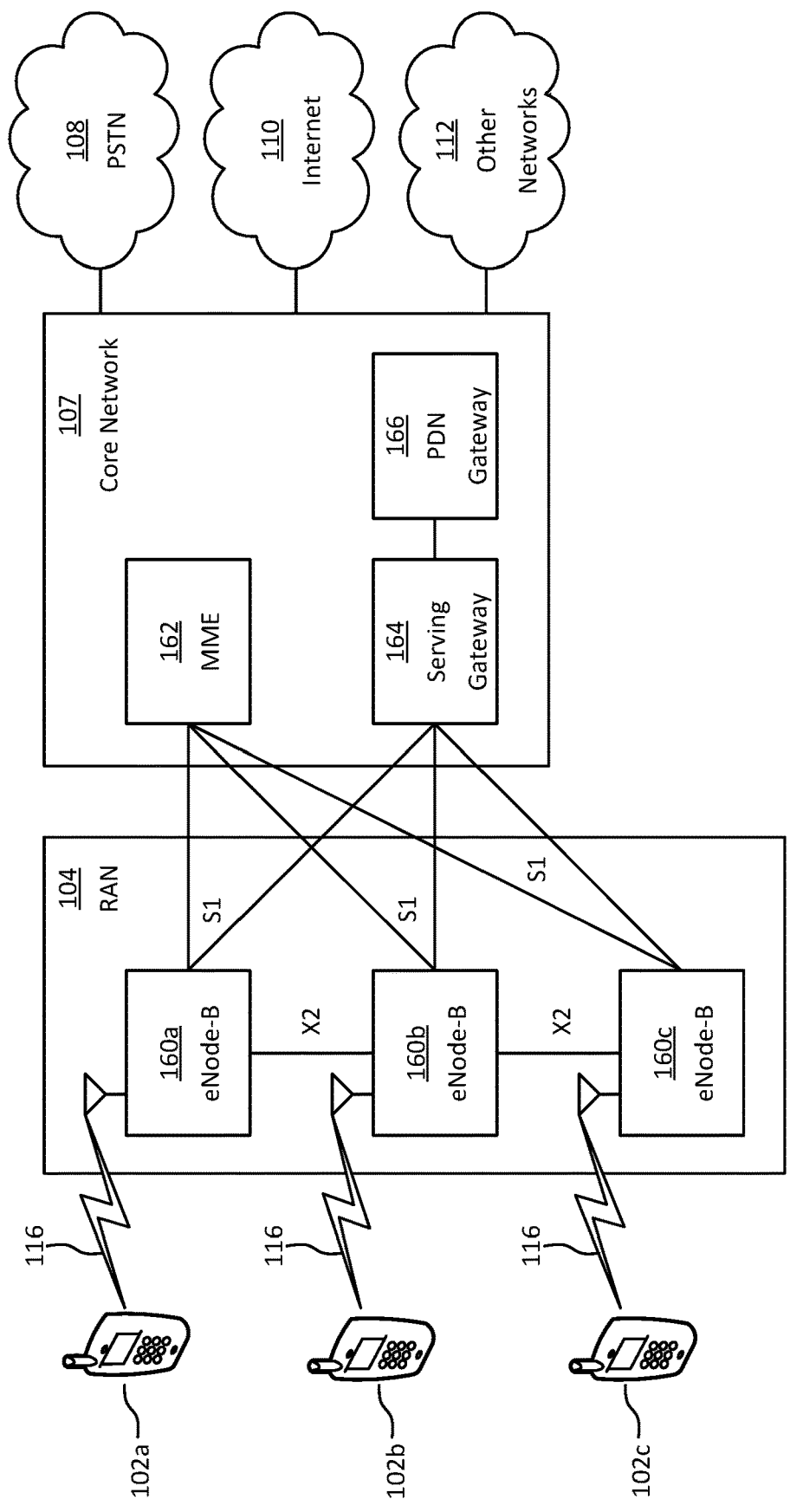

FIG. 10C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 10C, the eNode-Bs 160a, 160b, and 160c may communicate with one another over an X2 interface.

The core network 107 shown in FIG. 10C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an SI interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the SI interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 10D:
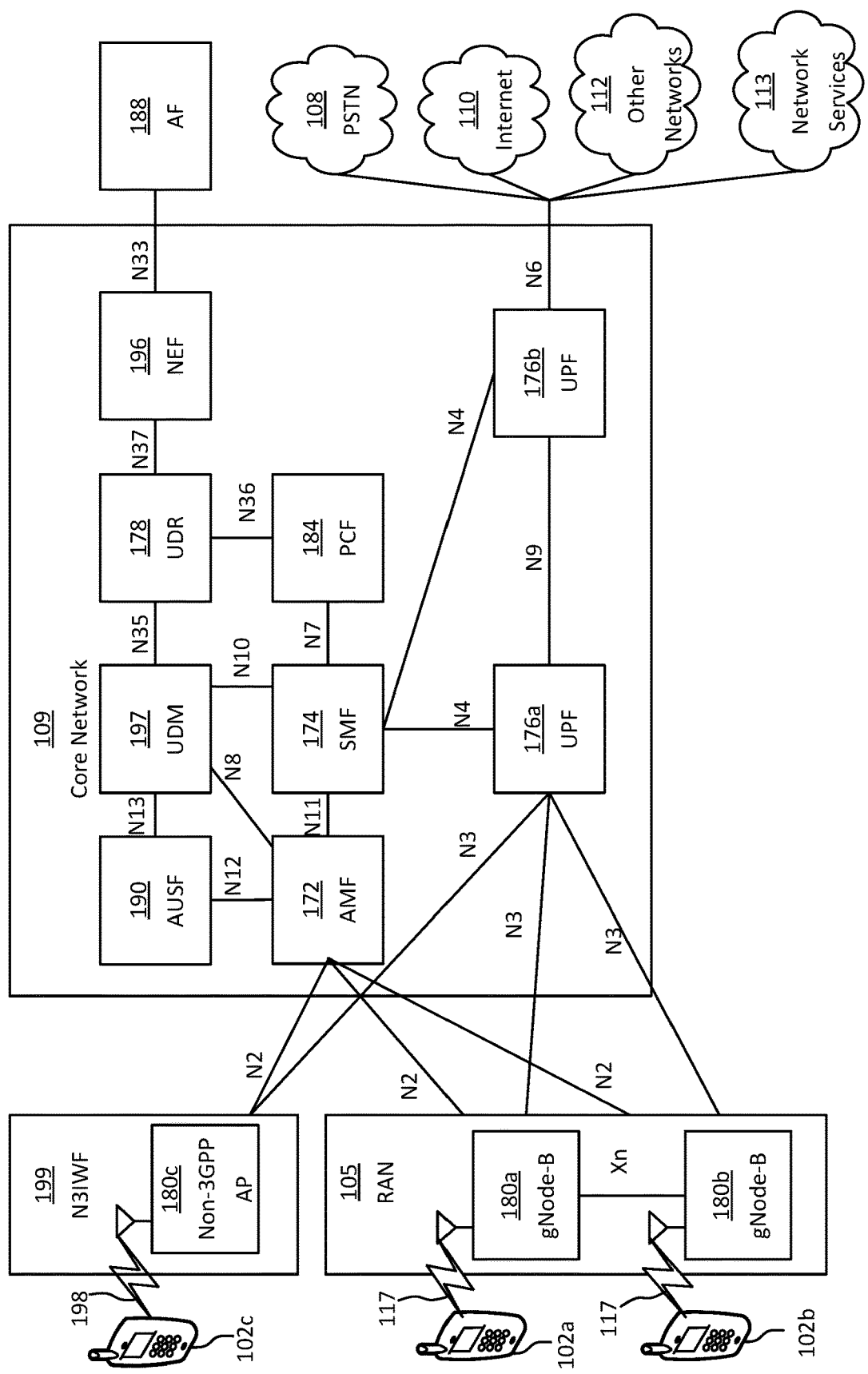

FIG. 10D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 10D, the gNode-Bs 180a and 180b may communicate with one another over an Xn interface, for example.

The core network 109 shown in FIG. 10D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 10G.

In the example of FIG. 10D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 10D shows that network functions directly connect to one another, however, it should be appreciated that they may communicate via routing agents such as a diameter routing agent or message buses.

In the example of FIG. 10D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward Non-Access Stratum (NAS) packets to/from the WTRUs 102a, 102b, and 102c via an N1 interface. The N1 interface is not shown in FIG. 10D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an application function (AF) 188 via an N5 interface. The N15 and N5 interfaces are not shown in FIG. 10D. The PCF 184 may provide policy rules to control plane nodes such as the AMF 172 and SMF 174, allowing the control plane nodes to enforce these rules. The PCF 184 may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface, and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance, and isolation.

3GPP has designed the 5G core network to support Network Slicing. Network Slicing is a useful tool that network operators can use to support the diverse set of 5G use cases (e.g., massive IoT, critical communications, V2X, and enhanced mobile broadband) which demand diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 10D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, which serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIG. 10A, FIG. 10C, FIG. 10D, and FIG. 10E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 10A-E are provided by way of example only, and it is understood that the subject matter disclosed and claimed herein may be embodied or implemented in any similar communication system, whether presently defined or defined in the future.

Figure 10E:
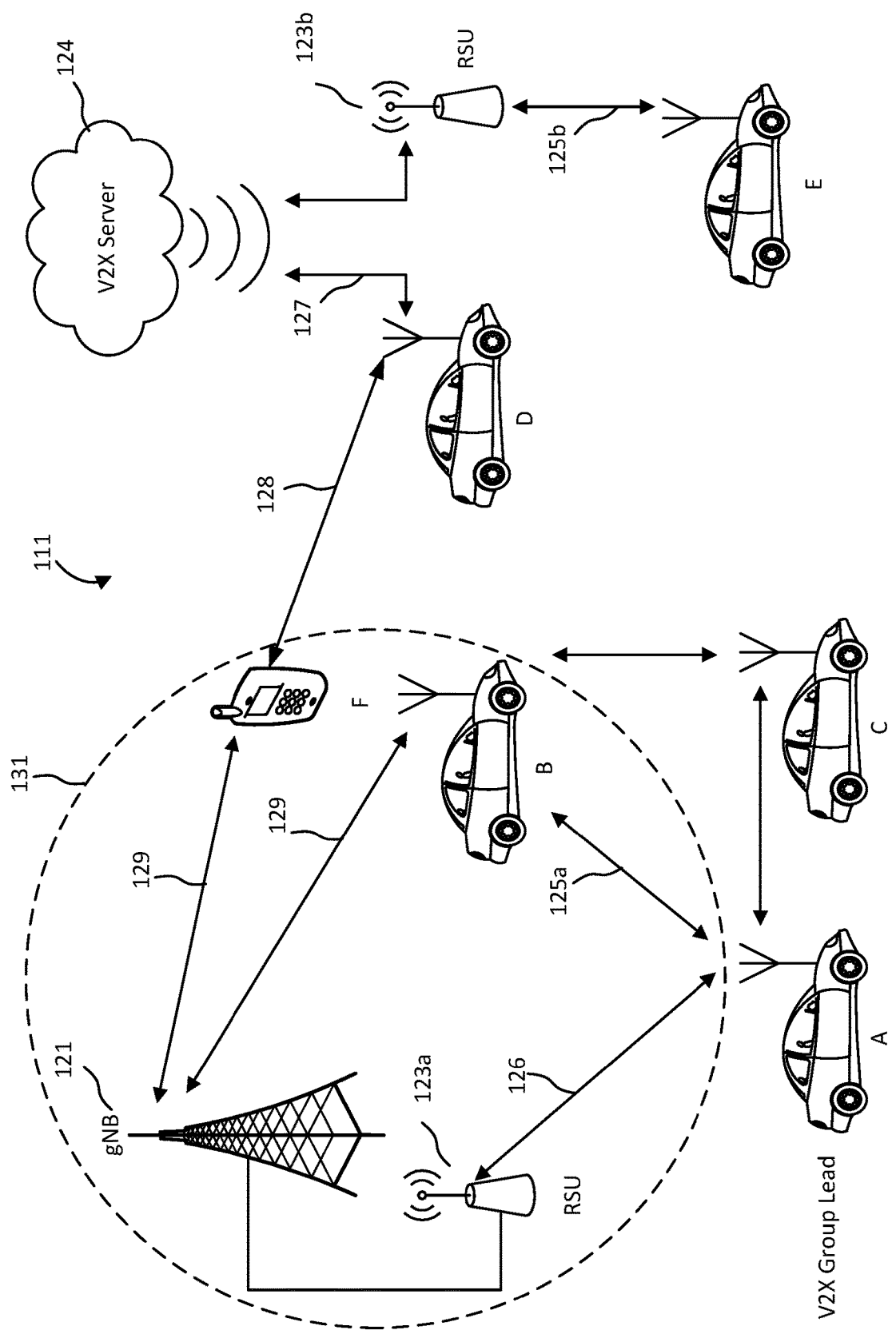
FIG. 10E shows another example communications system.

FIG. 10E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Roadside Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 10E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 10E, WRTU D, which is outside of the access network coverage 131, communicates with WTRU F, which is inside the coverage 131.

WTRUS A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 10F:
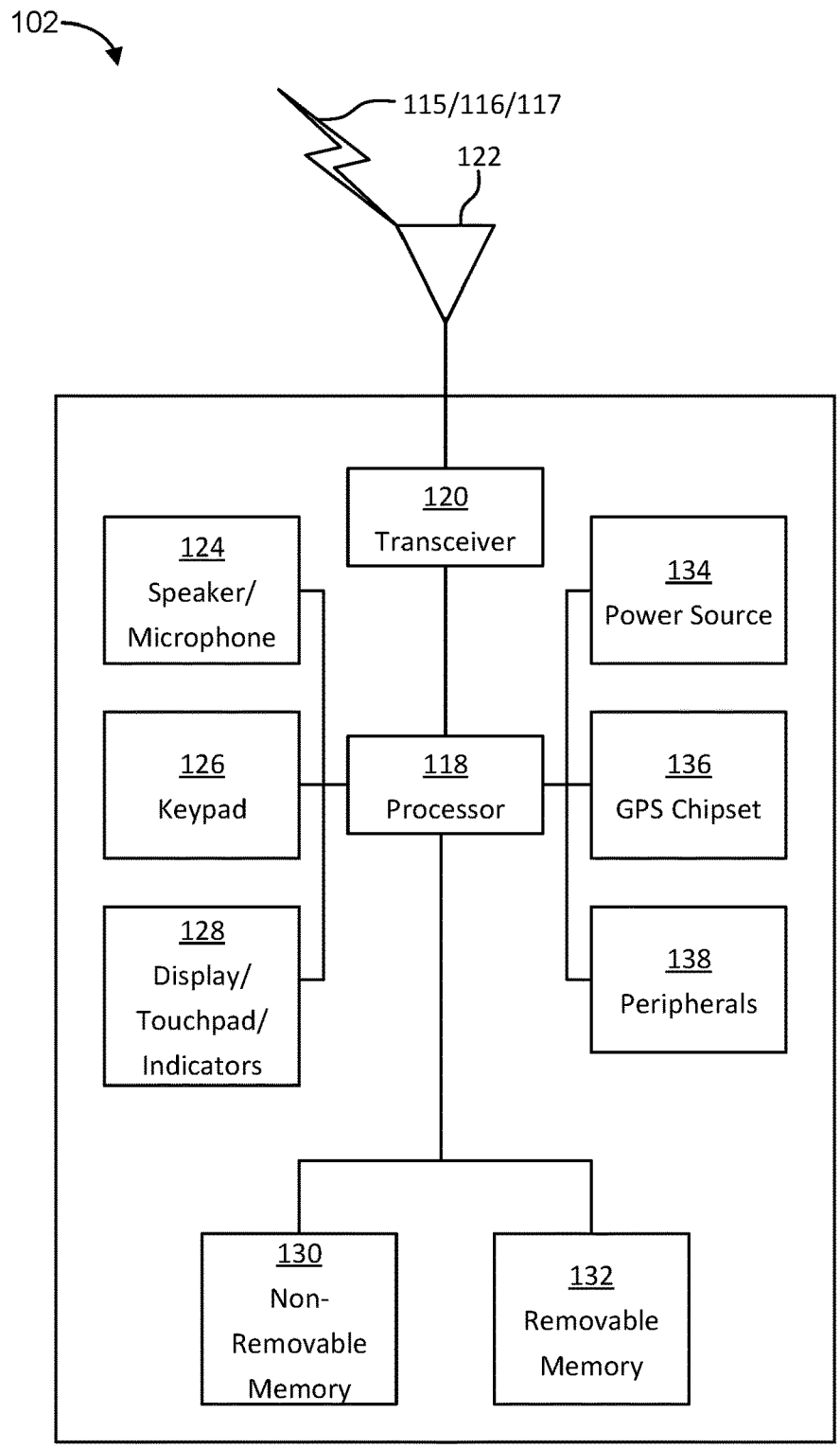
FIG. 10F shows an example apparatus or device, such as a WTRU.

FIG. 10F is a block diagram of an example apparatus, device, or wireless transmit/receive unit (WTRU) 102 that may be configured for wireless communications and operations in accordance with the systems, methods, and apparatuses described herein, such as a WTRU 102 of FIGS. 10A-E. The WTRU 102 may comprise a user equipment (UE), a mobile equipment (ME), a device, a sensor, a computing device, an IoT device or sensor, or the like. As shown in FIG. 10F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 10F and described herein.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 10F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 10A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 10F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 10G:
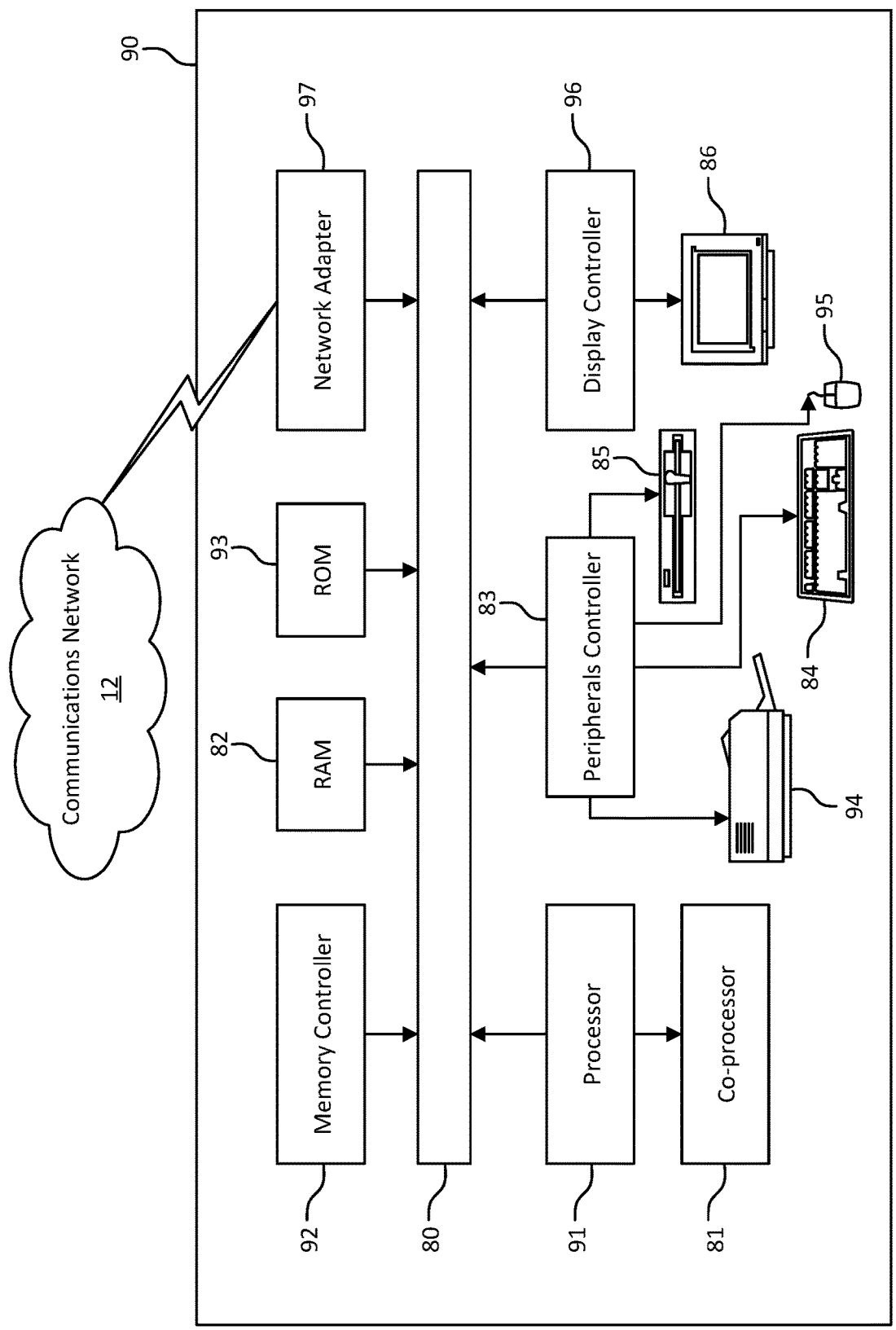
FIG. 10G shows an example computing system.

FIG. 10G is a block diagram of an exemplary computing system 90 in which one or more apparatuses of the communications networks illustrated in FIG. 10A, FIG. 10C, FIG. 10D and FIG. 10E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 10A-E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods, and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable, and non-removable media implemented in any non-transitory (e.g., tangible, or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information, and which may be accessed by a computing system.

What is claimed is:

1. A method performed by a wireless transmit/receive unit (WTRU), the method comprising:
   receiving a message comprising policy information associated with a personal network, wherein the policy information comprises one or more data network names (DNNs), one or more single network slice selection assistance information (S-NSSAIs), and one or more personal network identifiers;
   establishing a protocol data unit (PDU) session for the personal network using a DNN of the one or more DNNs, an S-NSSAI of the one or more S-NSSAIs, and a personal network identifier of the one or more personal network identifiers, wherein the PDU session provides access to the network for a plurality of devices on the personal network;
   receiving data from a device of the plurality of devices on the personal network; and
   sending the data to the network using the established PDU session based on the device being a part of the personal network.

2. The method of claim 1, wherein the PDU session is established by sending a PDU session establishment request message to the network.

3. The method of claim 2, further comprising receiving a PDU session establishment accept response from the network in response to the PDU session establishment request message.

4. The method of claim 2, wherein the PDU session establishment request message comprises the personal network identifier of the personal network.

5. The method of claim 2, wherein the PDU session establishment request message comprises the DNN.

6. The method of claim 1, wherein the PDU session established for the personal network is associated with a particular S-NSSAI/DNN combination.

7. The method of claim 1, wherein the policy information further comprises one or more of:
   one or more user identifiers for use in provisioning one or more non-3GPP devices of the plurality of devices of the personal network; or
   an indication of a maximum number of personal networks authorized for the WTRU.

8. The method of claim 7, further comprising provisioning one or more non-3GPP devices, of the one or more devices of the personal network, with the one or more user identifiers.

9. The method of claim 1, further comprising sending to at least one of the plurality of devices on the personal network, at least a portion of the policy information associated with the personal network.

10. The method of claim 1, wherein the policy information is associated with a plurality of personal networks.

11. A wireless transmit/receive unit (WTRU) comprising: comprising a processor configured to:
    receive a message comprising policy information associated with a personal network, wherein the policy information comprises one or more data network names (DNNs), one or more single network slice selection assistance information (S-NSSAIs), and one or more personal network identifiers;
    establish a protocol data unit (PDU) session for the personal network using a DNN of the one or more DNNs, an S-NSSAI of the one or more S-NSSAIs, and a personal network identifier of the one or more personal network identifiers, wherein the PDU session provides access to the network for a plurality of devices on the personal network;
    receive data from a device of the plurality of devices on the personal network; and
    send the data to the network using the established PDU session based on the device being a part of the personal network.

12. The WTRU of claim 11, wherein the PDU session is established by the processor being configured to send a PDU session establishment request message to the network.

13. The WTRU of claim 12, wherein the processor is further configured to receive a PDU session establishment accept response from the network in response to the PDU session establishment request message.

14. The WTRU of claim 12, wherein the PDU session establishment request message comprises the personal network identifier of the personal network.

15. The WTRU of claim 12, wherein the PDU session establishment request message comprises the DNN.

16. The WTRU of claim 11, wherein the PDU session established for the personal network is associated with a particular S-NSSAI/DNN combination.

17. The WTRU of claim 11, wherein the policy information further comprises one or more of:
    one or more user identifiers for use in provisioning one or more non-3GPP devices of the plurality of devices of the personal network; or
    an indication of a maximum number of personal networks authorized for the WTRU.

18. The WTRU of claim 17, wherein the processor is further configured to provision one or more non-3GPP devices, of the one or more devices of the personal network, with the one or more user identifiers.

19. The WTRU of claim 11, wherein the processor is further configured to send to at least one of the plurality of devices on the personal network, at least a portion of the policy information associated with the personal network.

20. The WTRU of claim 11, wherein the policy information is associated with a plurality of personal networks.

* * * * *